US005646853A

United States Patent [19]

Takahashi et al.

[11] Patent Number: 5,646,853

[45] Date of Patent: Jul. 8, 1997

[54] TRAFFIC CONTROL SYSTEM

[75] Inventors: Kazunori Takahashi, Hitachi; Nobuhiro Hamada, Hitachiota; Masao Takatoo, Katsuta; Tohru Nagai, Ibaraki-ken; Toshiko Suzuki, Katsuta, all of Japan

[73] Assignee: Hitachi, Ltd., Tokyo, Japan

[21] Appl. No.: 913,902

[22] Filed: Jul. 16, 1992

[30] Foreign Application Priority Data

Jul. 19, 1991 [JP] Japan .................................... 3-179539

[51] Int. Cl.[6] .......................... G06F 163/00; G08G 1/08; G08G 1/081; G08G 1/0962

[52] U.S. Cl. .......................... 364/436; 340/911; 348/149; 364/437

[58] Field of Search .................................... 364/436, 437, 364/578; 340/990, 992, 911, 915, 920, 910, 917; 348/148, 149

[56] References Cited

U.S. PATENT DOCUMENTS

| | | | |
|---|---|---|---|
| 3,737,847 | 6/1973 | Kato et al. | 340/35 |
| 4,390,951 | 6/1983 | Marcy | 364/436 |
| 4,847,772 | 7/1989 | Michalopoulos et al. | 364/436 |
| 4,907,159 | 3/1990 | Mange et al. | 364/436 |
| 5,132,684 | 7/1992 | Pecker et al. | 340/905 |
| 5,182,555 | 1/1993 | Sumner | 340/905 |
| 5,247,439 | 9/1993 | Gurmu et al. | 364/424.02 |
| 5,257,023 | 10/1993 | Furuya | 340/995 |
| 5,257,194 | 10/1993 | Sakita | 364/436 |
| 5,276,677 | 1/1994 | Ramamurthy et al. | 370/60 |
| 5,317,311 | 5/1994 | Martell et al. | 340/905 |
| 5,335,180 | 8/1994 | Takahashi et al. | 364/436 |

OTHER PUBLICATIONS

"Traffic Lights Control Technique", Traffic Engineering Study Group, pp. 62–80.

"Practical Traffic Engineering Series 8, Management and Operation of Traffics on Roads", pp. 125–135, 141–147.

*Primary Examiner*—Michael Zanelli
*Attorney, Agent, or Firm*—Antonelli, Terry, Stout & Kraus

[57] ABSTRACT

A traffic control system having a road information storing unit for storing information of a road map and the capacity of roads on the road map, a traffic measuring unit for measuring the traffic of roads, a traffic increase/decrease quantity calculating unit for calculating a traffic increase/decrease quantity between main points by using the measured traffic, a road traffic calculating unit for calculating traffic of a main road, by using the traffic increase/decrease quantity, and an area determining unit for determining an area which is the area for congestions less traffic by using the calculated traffic and the road capacity while maintaining the traffic increase/decrease quantity at a proper value. It is possible to control the traffic while considering nearby traffic conditions, to prevent and relieve congestion, and to maximize the traffic of roads, thereby minimizing the time required for reaching a destination.

40 Claims, 14 Drawing Sheets

TRAFFIC CONTROL SYSTEM

BACKGROUND OF THE INVENTION

The present invention relates to a traffic control system, and more particularly to a traffic control system for controlling traffic on roads.

As described, for example, in "Traffic Lights Control Technique" at page 62–80 compiled by the corporate Traffic Engineering Study Group or "Practical Traffic Engineering Series 8, Management and Operation of Traffics on Roads" at pp. 125 to 135, operation parameters of traffic lights have been controlled heretofore so as to maximize the traffic of motor vehicles passing through each main intersection or through a set of main intersections, by using the results of traffic survey or traffic information measured by vehicle detectors. Namely, operation parameters of traffic lights have been controlled by using information of only measured traffic, road occupancy factors, length of congested roads, the number of vehicles and the like.

Conventional bypath road guidance display devices such as LEDs provide information of only a bypath road, when information of traffic accidents or congestion on roads is given from some sources and it is judged that it is impossible, or it takes a lot of time, to pass through such congested roads. In this case, information of only a bypath road has been provided independently of how the traffic of the bypath road is.

In conventional parking systems using parking meters, when a vehicle parks in a parking space, it is locked and the timer of a parking meter starts operating. A parking toll calculated from a predetermined time charge is displayed on a display such as an LED or LCD. The lock of the vehicle is released after the toll is paid to the parking meter, and the vehicle leaves the parking space. However, conventional parking systems operate without considering the traffic of nearby roads.

In conventional traffic simulation, the road traffic has been simulated using actually measured traffic at some points on roads, vehicle speeds, traffic signal information, and road capacities obtained from a road map.

As described above, with conventional traffic control, only traffic of motor vehicles passing through a main intersection is controlled for efficiency purposes. Conventional traffic control does not consider therefore to reduce the number of motor vehicles concentrating on such a main intersection. It has been impossible to deal with excessive concentration of motor vehicles on a particular main intersection, resulting in road congestion.

With conventional traffic control, the dynamically changing traffic is measured by vehicle detectors, on the assumption that the physical capacities of roads will not change. Therefore, reduction of traffic caused by traffic accidents or illegal parking on roads cannot be recognized. The conventional traffic control assuming the constant road physical capacities does not prevent road congestion.

A conventional bypath road guidance display does not consider the traffic of a bypath road. Therefore, if motor vehicles are concentrated on a bypath road, congestion on this bypath road occurs, taking a longer time in passing through the bypath road than passing through the original road.

With a conventional parking system, motor vehicles are allowed to park so long as there is an available parking space, independently of the traffic conditions of nearby roads. Therefore, vehicles going to parking areas during rush hours in the morning or evening may cause road congestion, or in some cases vehicles cannot park even at midnight when roads are no longer congested. Whether a vehicle can park or not can be known only after it reaches a parking area and stops thereat, generating unnecessary traffic.

A conventional traffic simulator does not consider the capacity of parking area facilities along a road the traffic of which is measured at its inlet and outlet points, and the traffic of vehicles going into or coming from another branch road connected to the road at an intermediate point. Therefore, a precise traffic simulation is not possible.

SUMMARY OF THE INVENTION

It is an object of the present invention to provide a traffic control system, capable of minimizing the traffic of motor vehicles by considering the traffic of nearby roads and preventing and eliminating road congestion, and reducing the time required for reaching a destination.

According to a first aspect of the present invention, there is provided a traffic control system comprising: road information storing means for storing information of a road map and the capacity of roads on the road map; traffic measuring means for measuring the traffic corresponding road; traffic increase/decrease quantity calculating means for calculating a traffic increase/decrease quantity between predetermined points, by using the measured traffic; road traffic calculating means for calculating traffic of a predetermined road, by using the traffic increase/decrease quantity; and area determining means for determining an area which is the area for congestion-less traffic, by using the calculated traffic and the road capacity while maintaining the traffic increase/decrease quantity to a proper value.

The traffic control system may include: available traffic calculating means for calculating the maximum traffic allowed to enter the area without congesting the area; and available traffic suppressing means for suppressing the traffic moving toward the area in accordance with the maximum traffic. The traffic control system may also include area traffic increasing means for controlling the increase in the traffic within an area.

According to a second aspect of the present invention, there is provided a vehicle guidance system for guiding a vehicle on a road to a bypath road, comprising: target traffic setting means for setting a target traffic of a bypath road; real-time traffic measuring means for measuring the traffic of the bypath road in real time; instruction means for supplying an instruction to a vehicle; and guidance control means for controlling the instruction means so as to reduce a difference between the target traffic and the real-time traffic.

According to a third aspect of the present invention, there is provided a vehicle instructing and controlling system for controlling traffic, comprising: instruction means for supplying an instruction to a vehicle; real-time traffic measuring means for measuring the traffic of a road in real time; a simulator for estimating a vehicle wait time by using the instruction supplied by the instruction means and the real-time traffic; and a controller for controlling the instruction means so as to reduce a sum of the estimated wait times multiplied by predetermined coefficients.

According to a fourth aspect of the present invention, there is provided a traffic control system, comprising: means for receiving the parameters of traffic signals on a road; traffic measuring means for measuring traffic in real time; a simulator for estimating traffic by using the parameters of the traffic signals and the real-time traffic; calculating means for calculating a difference between the estimated traffic and actual traffic at the time corresponding to the estimated traffic; instruction means for providing an indication of a road point at which the difference becomes equal to or larger than a predetermined value; and display means responsive to an instruction by the instruction means for displaying the road point and an indication of an occurrence of an accident at the road point.

According to a fifth aspect of the present invention, there is provided a simulator comprising: traffic difference calculating means for calculating a difference between integrated traffic at opposite ends of a road section having traffic measuring means at opposite ends; parking capacity calculating means for calculating the parking capacity of a parking area at the road section by using the integrated traffic difference; and intermediate inflow/outflow traffic calculating means for calculating intermediate inflow/outflow traffic going into or coming from another road section connected to an intermediate point of the road section exclusive of the traffic measuring points, by using the integrated traffic difference, wherein the traffic is estimated by using the traffic at opposite ends, the parking capacity of the parking area at the road section, and the intermediate inflow/outflow traffic.

According to the first aspect of the present invention, a traffic increase/decrease quantity between main points is obtained based upon measured traffic. When concentrated traffic to a particular road is detected, the traffic is distributed to nearby roads. In this manner, a nearby road area is determined to be an area for congestion less traffic. Outside this area, the traffic allowed to enter the area is suppressed to the maximum traffic which will not cause road congestion within the area. Within the area, parking is prohibited and vehicles are guided to various other roads within the area, in order to use the road capacities as efficiently as possible and minimize the traffic within the area.

According to the second aspect of the present invention, in guiding a vehicle to a bypath road, first a target traffic of the bypath road is set and the traffic of the bypath road is measured in real time. The target traffic is compared with the real-time traffic, and guidance to the bypath is controlled so as to reduce the difference. If the traffic of the bypath road is smaller than the target traffic, more vehicles are guided to the bypath road. If the traffic of the bypath road is larger than the target traffic and there is a possibility of congestion, guidance to the bypath road is stopped, or another bypath road is used. With such an arrangement, vehicles can be guided without any congestion at the bypath road, preventing the traffic from increasing due to congestion.

According to the third aspect of the present invention, a future wait time is simulated from the contents indicated by the instruction means (e.g., traffic signals and display devices) for supplying an instruction to vehicles so as to control the traffic, and from the real-time traffic. The instruction means is controlled to minimize the sum or weighted sum of wait times of vehicles. With such an arrangement, it is possible to know the future wait time and control the traffic signals and display devices before congesting occurs. It takes a lot of time for congestion having already occurred to be relieved. Use of this arrangement can deal with such a problem in advance, thereby minimizing the time required for reaching a destination.

According to the fourth aspect of the present invention, future traffic is estimated using a simulator. The measured traffic is compared with the estimated traffic, and if there is a large difference therebetween, it is assumed that a traffic accident or vehicles parking on a road has occurred. A candidate point of the accident or parking vehicle may be considered as such a point where the difference between the traffic estimated by the simulator and the measured traffic differs abruptly. This candidate point is displayed on the display means so that an accident can be indicated to vehicles or to an operator of the traffic control system, to thereby deal with potential congestion.

According to the fifth aspect of the present invention, the number of vehicles at a parking area near a road section and the intermediate inflow/outflow traffic to and from a branch road can be estimated using a small number of measuring points, specifically by using a difference between integrated traffic at opposite ends of each road section. If there is no vehicle which went into or came from another road section via the branch road connected to an intermediate point of the road section, the integrated traffic measured at one end of the road section is equal to that measured at the other end of the road section. Namely, the intermediate inflow/outflow traffic can be estimated from the difference. The number of parking vehicles and average parking time at parking areas near the road section can be calculated, if the integrated inflow traffic of the road section becomes equal to the integrated outflow traffic at the time lagged by the time period necessary for passing through the road section, by using the time lag and the outflow traffic during the time lag period. In order to measure the number of parking vehicles at parking areas near the road section and the intermediate inflow/outflow traffic of the road section, a number of measuring points finely set to the road section has been required heretofore. This method is, impractical. For this reason, the number of parking vehicles and the intermediate inflow/outflow traffic have not been used as simulation parameters. Use of these parameters allows one consideration of any a reduction in road capacity caused by vehicles parking on roads and the traffic of branch roads with no measuring points, thereby providing correct traffic simulation. With such simulation, the traffic control can be performed effectively.

The fundamental principle of the present invention will be described with reference to FIG. 19.

In FIG. 19, a four-forked road intersection C1 has roads K1, K2, K3 and K4. Similarly, a four-forked road intersection C2 has roads K2, K21, K22 and K23, and another four-forked road intersection C3 has roads K3, K31, K32 and K33.

Traffic TK1 on the road K1 in the direction indicated by an arrow represents an outflow traffic from the intersection C1. This outflow traffic TK1 is a sum of an inflow traffic TK2 from the road K2 to the road K1, an inflow traffic TK3 from the road K3 to the road K1, and an inflow traffic TK4 from the road K4 to the road K1. It is assumed that congestion occurs when the traffic TK1 exceeds a predetermined traffic which depends on the state of the road K1.

According to the present invention, in order to prevent congestion, if the traffic TK1 for example is estimated to exceed the predetermined traffic value, at least one of traffic TK2, TK3 and TK4 is controlled to be reduced.

In order to reduce traffic TK2 for example, it is conceivable to adjust the turn-on time of a green traffic signal at the intersection C1 or to display a bypath guide at the intersection C1. With such a scheme, an improved result can be expected to a certain degree. However, in order to radically reduce the traffic TK2, it is essential to reduce at least one of an inflow traffic TK21 from the road K21 to the road K2, traffic TK22 from the road K22 and traffic TK23 from the road K23, respectively at the intersection C2 one block before the intersection C1 on the road K2.

Similarly, in order to radically reduce the traffic TK3 for example, it is essential to reduce at least one of an inflow traffic TK31 from the road K31 to the road K3, traffic TK32 from the road K32 and traffic TK33 from the road K33, respectively at the intersection C3 one block before the intersection C1 on the road K3.

It is to be noted that in reducing the traffic of a certain road connecting to an intersection, inflow traffic at another intersection is reduced. This substantially reaches the same result as giving a bypath guide to vehicle drivers at the preceding intersection prior to going toward the intersection connecting to a road at which congestion is anticipated.

According to the present invention, in order to control the traffic of a road connected to an intersection, the traffic at a different intersection is controlled. Namely, the traffic control area is expanded to check the traffic of a road, not as local traffic but as part of traffic of the expanded area, providing a reasonable and natural traffic control. If the traffic control at the expanded area is insufficient, the expanded area is further extended.

In order to realize the above-described fundamental principle of the present invention, it is necessary to obtain more precise traffic an each road. For example, referring to FIG. 19, the inflow traffic TK2 from the road K2 to the road K1 can be obtained from a precise right-turn percentage of vehicles from the road K2 to the road K1. Furthermore, it is conceivable that the above-described predetermined traffic becomes greater than apparent traffic determined from the structure of the road K1 if a large parking area is present along the road K1. Still further, the predetermined traffic value may become less than the apparent traffic if parking or accidents occur on the road K1.

There is also the case where an outflow of traffic at an intersection does not necessarily represent the correct outflow traffic of the road. For example, referring to FIG. 19, assuming that a vehicle goes into or comes from another branch road (not shown) connected to the road K1, the traffic TK1 does not represent the correct traffic of the road K1. In such a case, it becomes necessary to obtain the correct traffic of the road K1 by taking into consideration the measured traffic at another intersection (not shown) downstream of the road K1.

DESCRIPTION OF THE PREFERRED EMBODIMENTS

An example of the traffic control system according to the present invention will be described with reference to FIG. 1. Information to be set to this system includes the traffic capacity 1*a* of each road within an area where the traffic is controlled, an average parking time 1*c* at each parking area, a right/left turn percentage 1*d* at an intersection of a traffic not measured, and control tactics 1*j* for each traffic vector pattern (VP). The road traffic capacity 1*a* represents a value under the condition of no accident and no road construction. A value to be influenced by road construction is also set to the system together with the construction period. In case of an accident, a value to be influenced is not set, but it is estimated by the system as will be later described. The average parking time 1*c* changes with the environmental conditions whether a parking area is located at a shopping center, restaurants or like areas. The average parking time 1*c* is therefore set while considering the environmental conditions. Some parking areas automatically measure a vehicle average parking time. In such a case, this measured value is set to the system. The right/left turn percentage is measured at some intersection (1*b*) and not measured at some intersection (1*d*). In the latter case, the right/left turn percentage is required to be set to the system. An approximate value of the right/left turn percentage can be obtained from the list of a traffic increase/decrease quantity to be described later. In the present invention, the "keep to the left" ordinance used in Japan and England is assumed illustratively.

Figure 2:
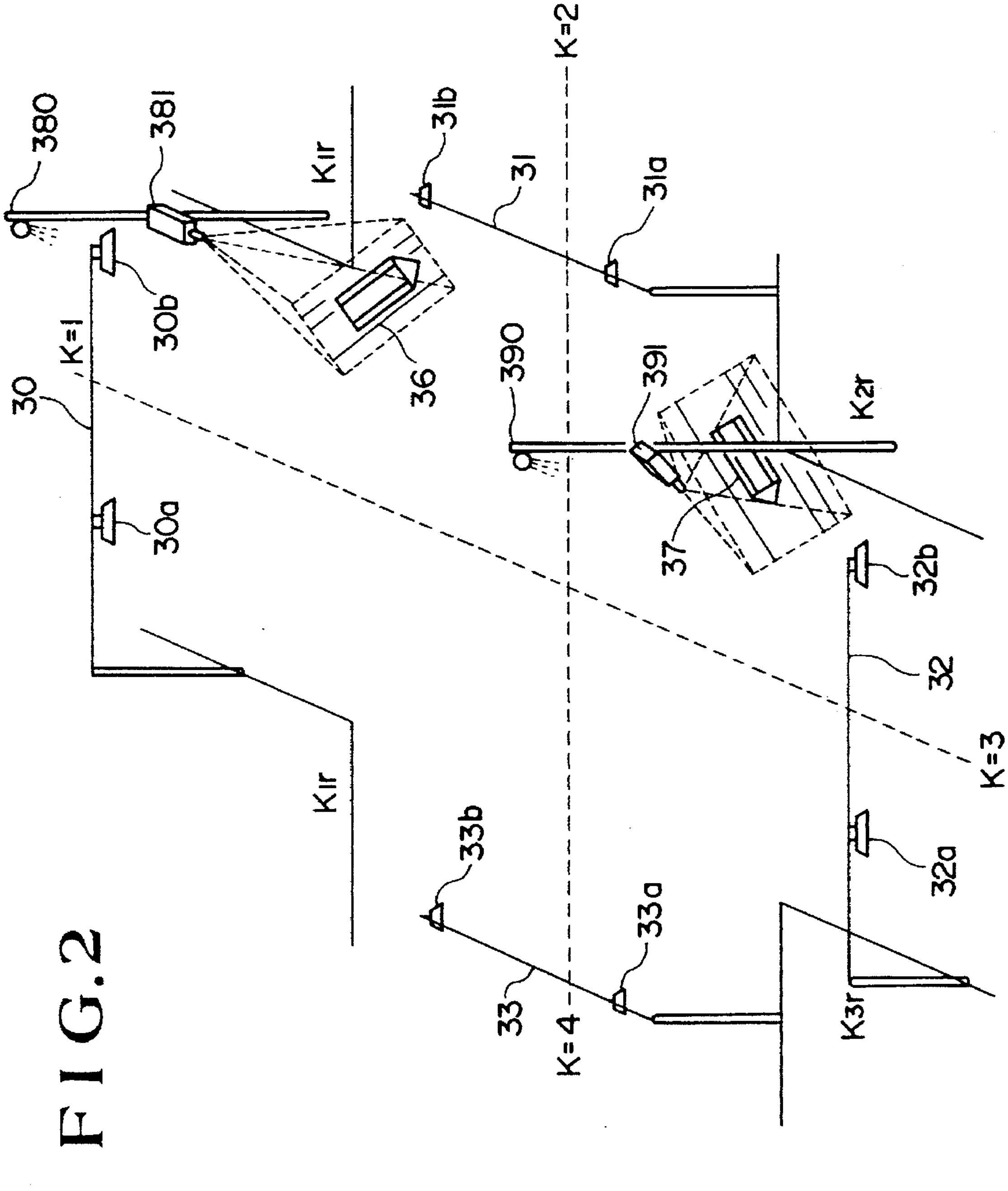
FIG. 2 is a schematic diagram illustrating a traffic measuring method used in the present invention.

A real time traffic measurement 1*b* will be described with reference to FIG. 2. In the real time traffic measurement, straight traffic flows and right/left turn percentages are measured at each main intersection. As traffic measuring means, various vehicle detectors may be used. Such vehicle detectors include, for example, a vehicle detector which applies a sound wave to a vehicle and receives a reflected sound wave, and a vehicle detector which applies a slit beam or spot beam to a vehicle, and receives a reflected beam at a different angle from that at which the beam was applied. The right/left turn percentage can be obtained by processing an image taken by a camera and measuring the direction, size and the like of each vehicle. FIG. 2 shows a four-forked road intersection by way of example. The directions of moving (right/left, straight) at each road (k=1 to 4) at the four-forked road intersection are measured. In measuring the traffic, in order to make simlpy to trace the flow of vehicles, there is used a flow equation which assumes that the sum of outflow traffic is equal to the sum of inflow traffic at an intersection. The straight traffic at the roads (k=1 to 4) measured by vehicle detectors 30*a*, 30*b*, 31*a*, 31*b*, 32*a*, 32*b*, 33*a* and 33*b* and the right/left turn traffic measured at any of two adjacent roads at the intersection are substituted into the flow equation, to thereby obtain the remaining unknown traffic (right/left, straight). In this embodiment, left-turn vehicles 36, 37 are counted at the left-turn corners K1r and K2r by using cameras 381 and 391. In order to reduce a measurement error under a low contrast between the background and vehicles, which a problem of the conventional system that is to be solved by the present invention, slit beams are applied from slit beam radiators 380 and 390 to the field of view of the cameras 381 and 391 mounted at the left-turn corners K1r and K2r. A displacement between slit beams from the road and a vehicle is used in determining the direction of the vehicle and identifying the left-turn vehicle.

A parking area capacity if and intermediate inflow/outflow traffic it are calculated in the following manner. A road between two main intersections installed with vehicle detectors is called a road section. The numbers of vehicles going straight, i.e., straight traffic, are measured at opposite ends of a road section for a long time period, and a difference between integrated inflow and outflow traffic is calculated. This traffic difference is the sum of the calculated capacity 1*f* of a parking area along the road section and the calculated intermediate inflow/outflow traffic 1*t* going into and coming from a branch road connecting to the road section at the intermediate point thereof. Vehicles at a parking area at the intermediate of the road section go into the road section after parking. Therefore, the integrated inflow traffic becomes equal to the integrated outflow traffic after the time lag of the parking time. By monitoring the integrated inflow/outflow traffic, it is possible to calculate an average parking time and the parking capacity 1*f*. The intermediate inflow/outflow traffic going into and coming from another road section via a branch road connected to the road section at the intermediate point can be calculated as a difference between inflow and outflow traffic integrated for a long time period. If the parking area capacity if and intermediate inflow/outflow traffic it cannot be separately calculated, these values are determined on a trial-and-error basis through sensitivity analysis of comparison with actually measured data.

Next, description will be given for a method of calculating a traffic increase/decrease quantity (hereinafter called OD) 1*e* between main points in accordance with straight traffic and right/left turn percentages at main intersections. A main point represents a traffic occurrence point, and includes a main terminal point on the border of a traffic control area and a main parking area within the traffic control area. First, roads connected to main points are assigned their traffic. The roads and their traffic are sorted in the descending order of traffic to form a list called a traffic list. By multiplying a traffic by a branching factor (right/left turn percentage) at each intersection, the traffic of roads branching from the starting road can be obtained sequentially. Then, the maximum traffic in the traffic list is distributed to the downstream roads in the manner described previously. The road whose traffic has been distributed to the upstream roads is removed from the traffic list, and the upstream roads are added to the traffic list.

In the above manner, traffic assignment is sequentially carried out starting from the maximum traffic, while simultaneously renewing traffic list. This operation is repeated until all traffic is assigned up to main points.

Next, by using the calculated traffic increase/decrease quantity OD 1*e* between main points, traffic 1*h* is distributed to each road. This traffic distribution is carried out, while using a shortest pass route between main points and considering so as not to exceed each road capacity. If there is a route over 100% prescribed traffic, the area covering all traffic between traffic increase/decrease point pairs associated with the route over 100% prescribed is determined. The state of the route over 100% traffic is called a saturated traffic condition (or congestion). In the case of the saturated traffic condition, the covered area and a congested traffic flow direction (herein called a main traffic flow vector) are compared with each other, and the area is cut off which area is defined in the abscissa direction by the covered area and in the ordinate direction by the area under 100% traffic contiguous to the covered area. The remaining area is the Smallest Area for Congestion Less Traffic (herein called SACLT) which means the smallest area of congestion less only within which a solution can be obtained.

Next, the traffic flow control for SACLT 1*k* will be detailed. The traffic control scheme is carried out differently between the inside and outside of SACLT. Outside of SACLT, the traffic signals and stop/parking guidance are controlled to suppress the traffic entering SACLT. On the other hand, inside of SACLT, the traffic signals and stop/parking guidance are controlled to minimize the traffic therein. Even if the traffic flows are classified into topology patterns of the main traffic flow vector patterns 1*s*, the number of pattern combinations are not so large. Therefore, the traffic control is performed in accordance with a classified main traffic flow vector pattern such as +, =and – as described below.

An optimum traffic signal control in is determined from the road traffic capacity 1*a* and OD list 1*e* between main points. In such a case, it is efficient if the control method is selected based upon the main traffic flow vector pattern VO 1*s*. The typical VP patterns include =, – and the like.

+: In the case of crossing traffic flows, the traffic at the intersection is dispersed (++). Bypath guidance for such dispersion is carried out outside of SACLT.

=: In the case of parallel traffic flows, the flows are considered as a pair of forward and backward directions, and the traffic is controlled for each direction. In this case also, bypath guidance is desirable to be carried out outside of SACLT.

–: In the case of only one road being congested, offsets may be changed during each time period. In this case, parking/stop guidance is performed upstream of SACLT.

In any VP pattern, the traffic signals are controlled so that the sum of inflow traffic on the border of SACLT 1*k* will not exceed a predetermined value. Excessive traffic is suppressed by traffic lights or by parking/stop guidance, upstream of SACLT 1*k*.

Optimum guidance 1*n*, particularly for a bypath guidance 1*p*, the bypath route and the bypath traffic are determined from SACLT information 1*q*, and in accordance with the bypath route and bypath traffic the traffic signals 10 are controlled as to their offsets, right/left turn indication, splits and the like. For the parking guidance 1*p*, the position of each parking area is checked from SACLT information 1*q* whether it is within SACLT or not. Then, guidance to suppress road parking is made inside of SACLT and a guidance to recommend road parking is made outside of SACLT. If the area outside of SACLT 1*k* is considered to be unchanged in the future, parking including road parking is recommended.

Next, a parking area inflow/outflow traffic 1*g* within the traffic control area will be described. If the number of present parking vehicles within the traffic control area is known, the parking area inflow traffic can be calculated from the average parking time. The parking area outflow traffic can be calculated from the difference between straight traffic upstream and downstream of the parking area and the inflow traffic.

Figure 6:
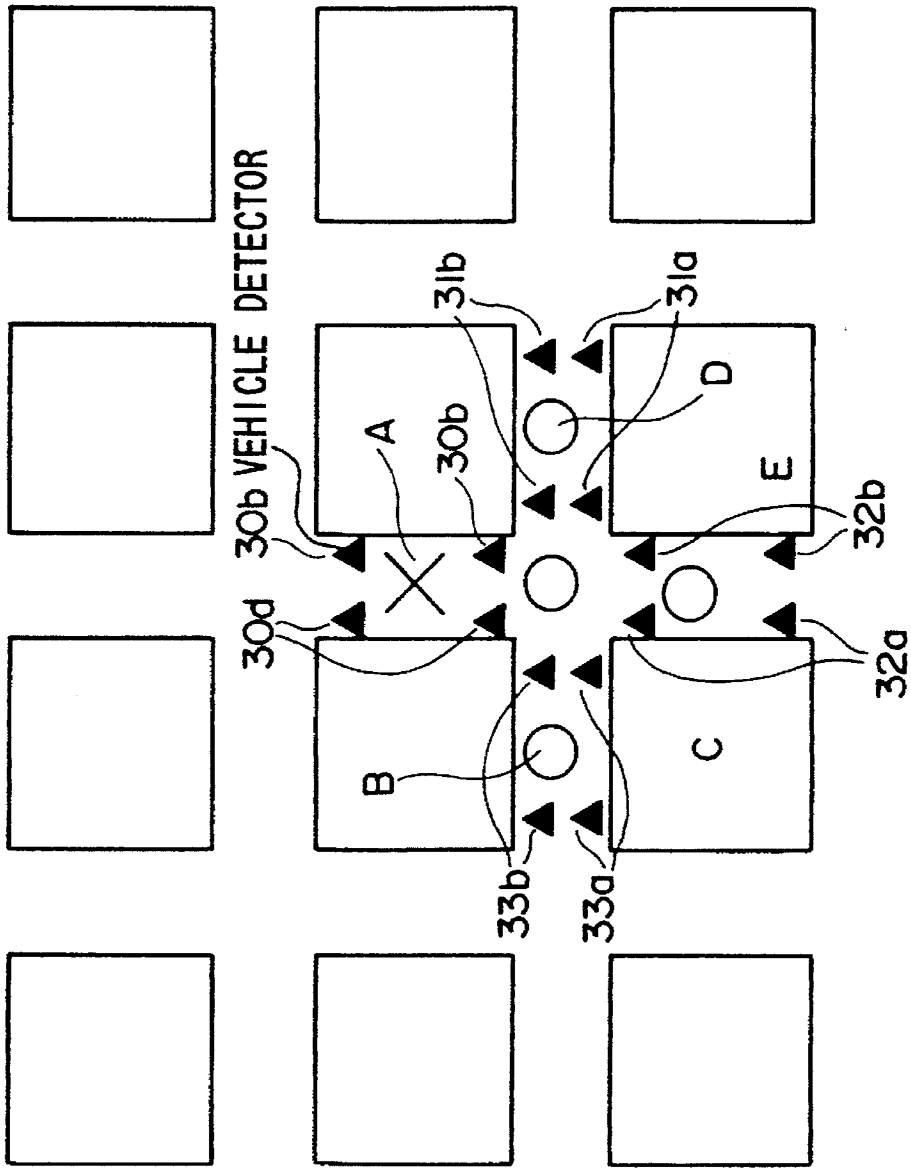
FIG. 6 is a diagram showing the function of the traffic control system of the present invention.

Real time road traffic simulation 1*i* and abnormal traffic condition estimation 1*m* will be later described with reference to FIG. 6. The calculated results are output as the traffic signal control output 1*o*, bypath and parking/stop guidance 1*p*, SACLT information 1*q*, and VP information 1*r*.

In the following, the intermediate inflow/outflow traffic it representing traffic in and from a branch road of a main road will be described in detail.

Figure 1:
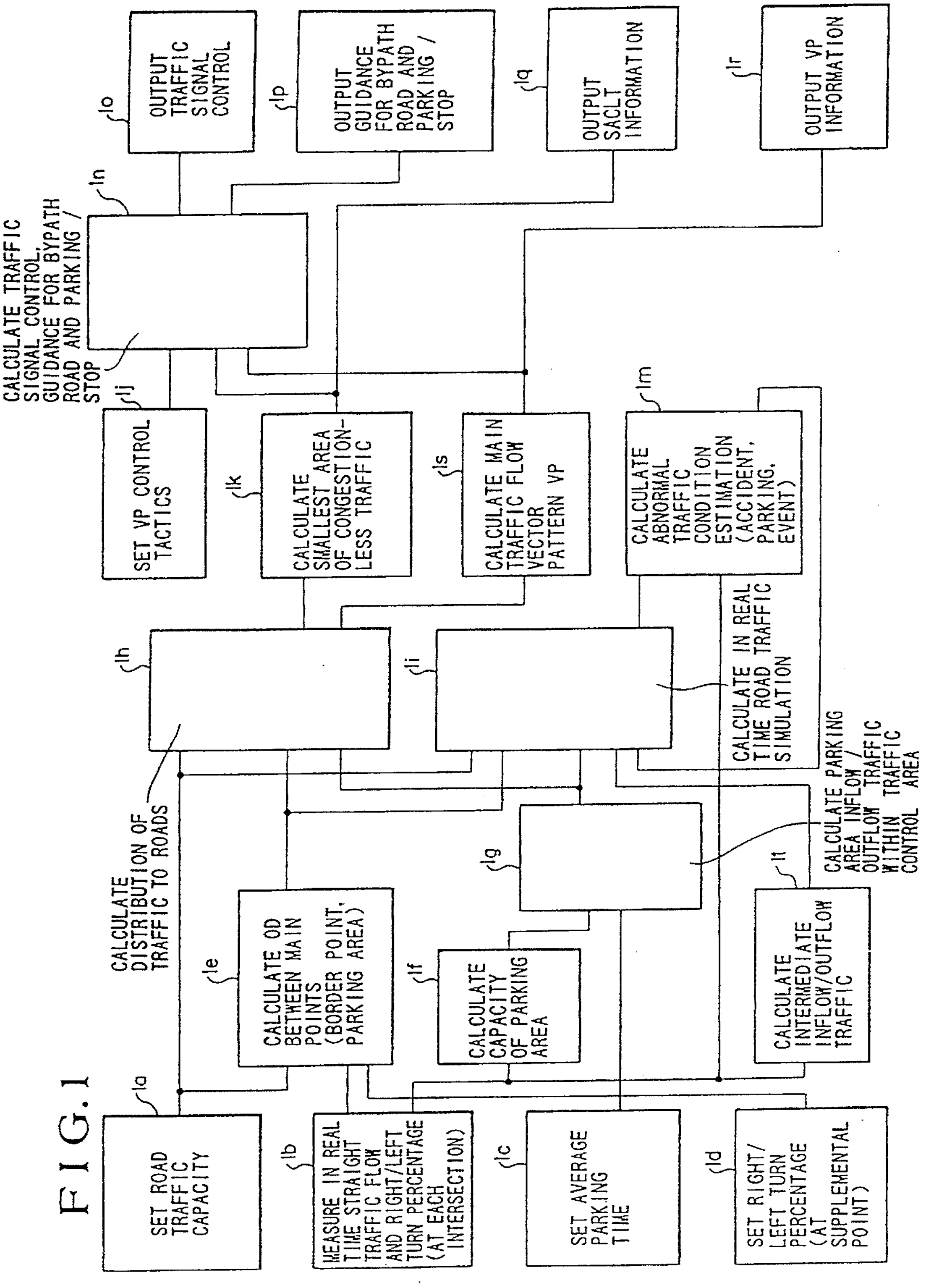
FIG. 1 is a block diagram showing an example of a traffic control system according to an embodiment of the present invention.

Traffic is measured in real time at opposite ends of a road and integrated during a day while modifying it with time. From this traffic, fundamental parameters necessary for the traffic control can be estimated. Fundamental parameters greatly influencing traffic congestion include:

(A) Same direction parking traffic Pp, (B) Opposite direction parking traffic Pf, and (C) Intermediate inflow/outflow traffic Tb (1*t* in FIG. 1).

These parameters are calculated in such a manner that they are used not for strictly discriminating between the traffic of passing vehicles outflow and inflow vehicles, but for estimating them. The same direction parking traffic is the number of vehicles moving in the same direction after parking, and the opposite direction parking traffic is the number of vehicles moving in the opposite direction after parking. The intermediate inflow/outflow traffic Tb is the number of vehicles temporarily departing from a main road, and the number of vehicles entering into a main road.

The direction of each vehicle entering a parking area going out of it is therefore not important, and so the opposite direction parking traffic can be expressed by using the same direction parking traffic. With this arrangement, the opposite direction parking traffic will not be superposed in the two directions.

Figure 3:
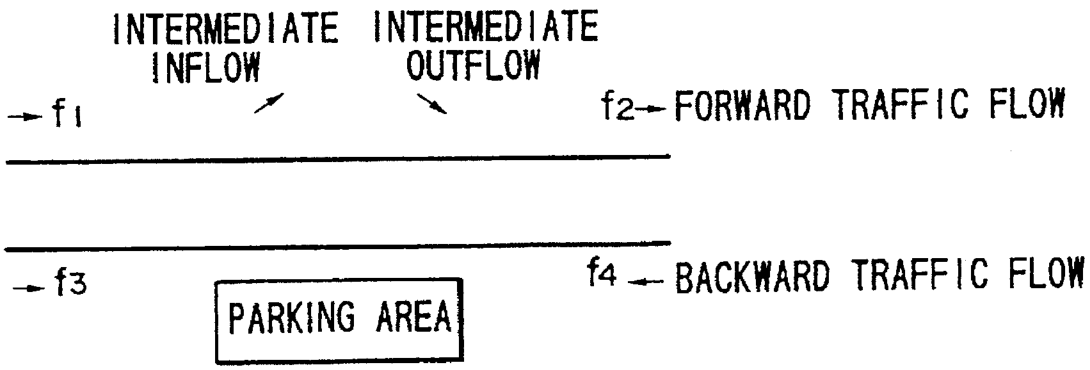
FIG. 3 is a diagram illustrating traffic flows on a road.
Figure 4:
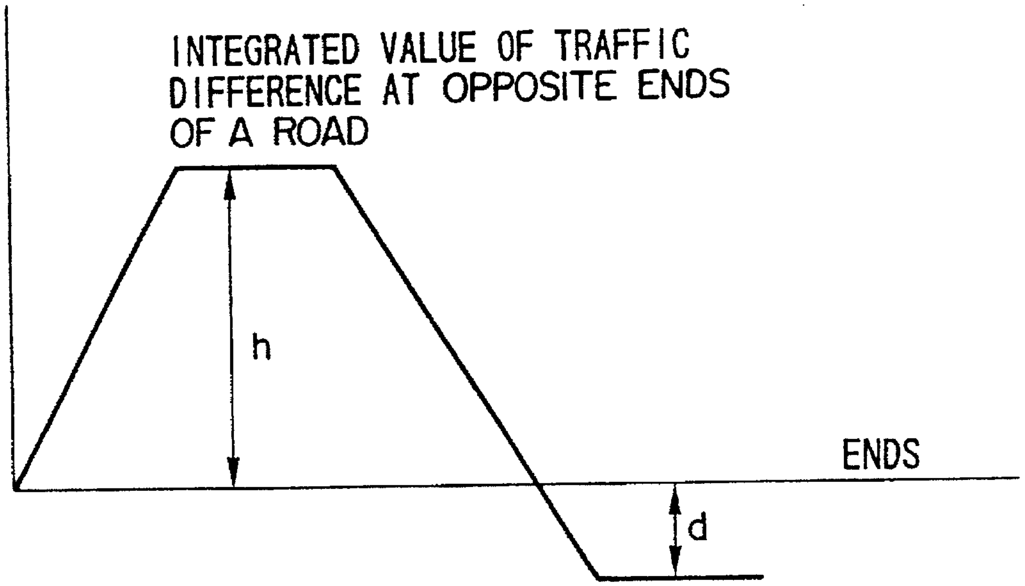
FIG. 4 is a diagram illustrating a difference between traffic flows at opposite ends of a road.
Figure 5A:
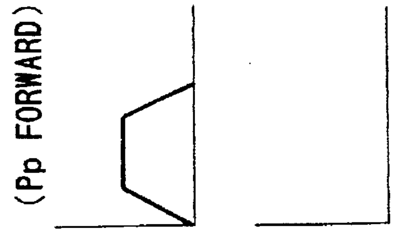
FIGS. 5A to 5I are examples of combination patterns of traffic flow differences.
Figure 5B:
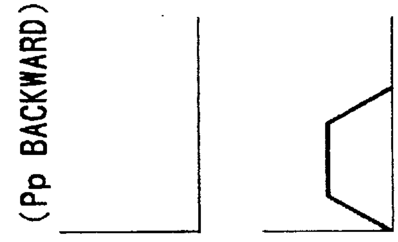
Figure 5C:
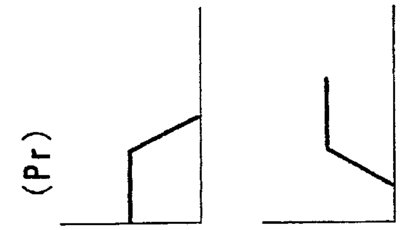
Figure 5D:
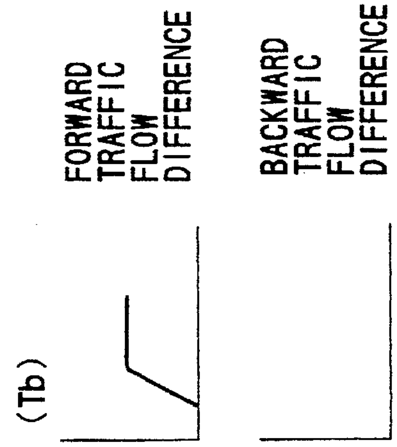
Figure 5E:
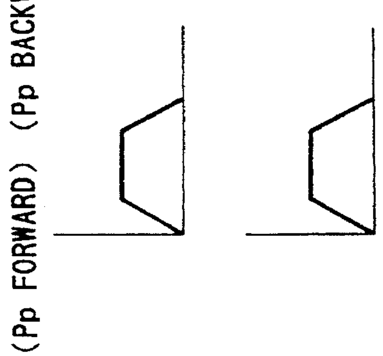
Figure 5F:
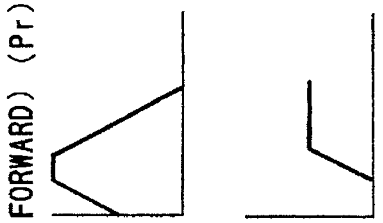
Figure 5G:
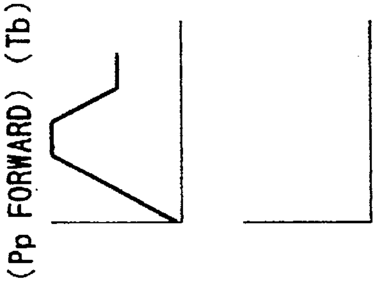
Figure 5H:
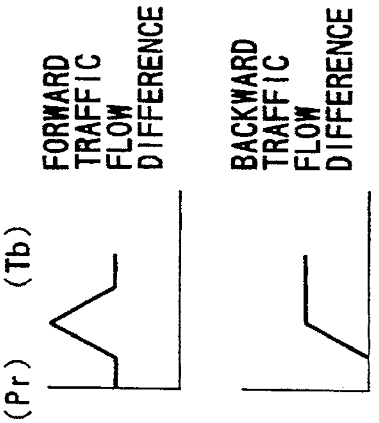
Figure 5I:
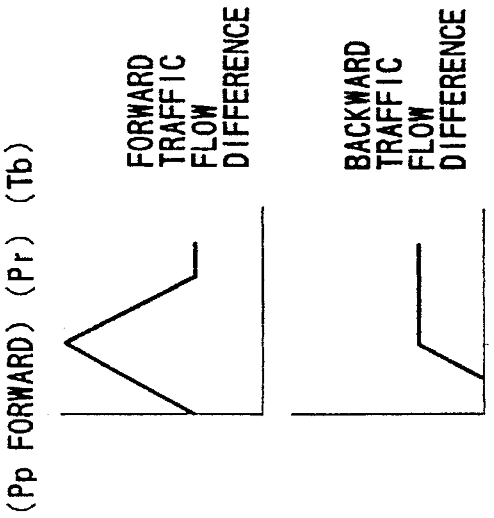

A road between two intersections will be described with reference to FIG. 3. At opposite ends of the road, the traffic in the forward and backward directions is measured. f1, f2, f3 and f4 represent the measured traffic. If there is no intermediate inflow/outflow traffic and parking vehicles and if some time difference is neglected, then f1=f2, and f3=f4. Paying attention to the traffic differences of at opposite ends of a road, the traffic data is read from the shape of the integrated difference of traffic at each of the opposite ends. Specifically, the above parameters (A), (B) and (C) are estimated from the height h of a trapezoid and the remaining quantity d after a day.

If the traffic is being combined in a complicated manner, separation between parameters is difficult. However, if the traffic has a fundamental combination, separation is possible. Therefore, measuring systems are configured for each separable traffic control area.

The conditions of the fundamental combination are as follows.

(1) The intermediate inflow/outflow traffic is unidirectional and is limited either to an inflow or outflow only.

This limitation is released by inputting the parking area capacity under the condition (D2) to be later described.

(2) The opposite direction parking traffic is unidirectional. The bidirectional opposite direction parking traffic are regarded as an equivalent pass traffic.

This limitation can be released from the view point of equivalence.

(3) The fundamental combinations are set up from (forward Pp, backward Pp, Pr, Tb). Examples of differences of forward and backward traffic for the fundamental combinations are shown in FIGS. 5A to 5I.

The parameters or variables are classified into those directly measured, those calculated, and those to be set to the system as in the following.

Measured variables:

a) Traffic flows f1, f2, f3, f4

Calculated variables:

b) Forward traffic difference f1–f2 c) Backward traffic difference f3–f4

1) Forward remaining quantity after a day

2) Backward remaining quantity after a day

3) Forward-backward remaining quantity after a day

4) Forward trapezoid height during a day

5) Backward trapezoid height during a day

Variables to be set:

1) Average parking time

2) Bypath time by intermediate inflow/outflow

3) Parking area capacity (on the condition that the parking area is large and the capacity cannot be separately determined because of the presence of a forward/backward intermediate inflow/outflow traffic as in the (D2) case to be described later).

Although it is difficult to precisely separate the intermediate inflow/outflow traffic and parking area capacity, they can be separated approximately by using the following procedures.

1) The forward-backward remaining quantity is used as the total intermediate inflow/outflow traffic (However, the forward and backward remaining quantities are used as the total intermediate inflow/outflow traffic in the (D1) case to be described later, i.e., in the case of f1=f2 or f2=f3 meaning simultaneity)

2) The time period while one of the traffic flows f1, f2, f3 and f4 exceeds the traffic capacity multiplied by k is called a traffic peak time period in the corresponding traffic flow direction.

3) The total intermediate inflow/outflow traffic is divided by the traffic peak time period to approximate the intermediate inflow/outflow traffic.

4) or the intermediate inflow/outflow traffic are proportionally distributed to the traffic to obtain the intermediate input/output traffic.

5) The traffic is subtracted by the intermediate inflow/outflow traffic to determine the parking capacity.

6) The trapezoid height (traffic flow—intermediate inflow/outflow traffic) is used to determine the parking area capacity.

7) The parking area inflow/outflow traffic is calculated taking into consideration the average parking time.

8) The parking area inflow/outflow traffic can be considered simply as the increase/decrease of the road capacity.

9) The number of parking vehicles changing with time is used as a traffic increase/decrease quality.

Lastly, the reasons why separation becomes difficult if the intermediate inflow/outflow traffic are combined, will be discussed.

The combinations of intermediate inflow/outflow traffic include:

(A) a combination of forward and backward intermediate outflow traffic coming from a branch road connected to a main road, (B) a combination of forward and backward intermediate inflow traffic going into a branch road connected a main road, (C) a combination of same direction intermediate inflow/outflow traffic, and (D) a combination of opposite direction intermediate inflow/outflow traffic.

Separation is possible for the combinations (A) and (B) because the remaining quantities after a day are not canceled between the forward and backward directions.

The condition (C) is divided into the condition (C1) where vehicles go into a main road at an intermediate point and depart from the main road at an intermediate point, and the condition (C2) where vehicles depart from a main road at an intermediate point and go into the main road at an intermediate point.

In the case of the condition (C1), this road cannot be regarded as a main road, and at least the measuring points are required to be changed.

In the case of the condition (C2), the road inclusive of the branch roads are regarded collectively as a single main road, so that separation is not necessary.

The condition (D) is divided into the condition (D1) where the inflow and outflow traffic are associated with simultaneity and there is no remaining quantity, and the condition (D2) where the inflow and outflow traffic are not associated with simultaneity and there is a large remaining quantity.

In the case of the condition (D1), there is no positive meaning of parking so that it cannot be considered as parking. Therefore, both the forward and backward remaining quantities can be judged as the intermediate input/output traffic.

In the case of the condition (D2), if the remaining quantity is extraordinarily large in excess of an expected upper limit of the parking area capacity, it can be considered not as the number of parking vehicles but as the intermediate inflow/outflow traffic. If there is a large parking area, the capacity of it is required to be calculated and input to the system.

From the above logic, it can be understood that the intermediate inflow/outflow traffic and the capacity of parking vehicles can be separated in most cases.

Next, the logical check of the intermediate inflow/outflow traffic will be described. For the case of the intermediate inflow/outflow traffic, it is essential that there is a pair of intermediate inflow/outflow traffic before and after the road (f intermediate inflow/outflow traffic =−f' intermediate inflow/outflow traffic). In some cases, it is conceivable that there is a set of three or more intermediate input/output traffic (f intermediate inflow/outflow +f' intermediate inflow/outflow traffic +f" intermediate inflow/outflow traffic =0, and so on). However, these cases should be considered as exceptions.

As described above, the traffic control system measures correct traffic of roads and controls the traffic by processing the measured traffic. The traffic outside and inside of calculated SACLT are controlled differently to eliminate congestion, maximize the traffic within the traffic control area, and minimize the time required for reaching a destination.

Next, the second embodiment of the traffic control system according to the present invention will be described with reference to FIG. 6. The traffic control system of this embodiment has traffic measuring apparatuses 30*a* and 30*b*, 31*a* and 31*b*, 32*a* and 32*b*, and 33*a* and 33*b* such as vehicle detectors, traffic signals whose parameters can be changed, and a computer for sending and receiving information to and from these elements. Vehicle detectors may use apparatuses such as described in "Practical Traffic Engineering Series 8, Management and Operation of Traffics on Roads" at pp.141 to 147.

The straight traffic flows and right/left turn percentages are obtained in the manner described with FIG. 2. A traffic simulator is on-line connected to this system to simulate a traffic condition by using real time traffic and traffic signal parameters. Integrated traffic during a predetermined time period, e.g., during five minutes, are used in this embodiment. The simulator estimates the traffic during the next five minutes, by using the traffic obtained during the preceding five minutes. The computer then compares the estimated traffic with the actual traffic obtained during the next five minutes, and calculates a difference therebetween. If the difference is small and can be considered within an allowable simulation error, it is judged that the traffic condition is unchanged. The above operation is repeated for each predetermined time period. If the difference is equal to or larger than a predetermined value, it is judged that something has occurred on some road, and information to this effect is displayed on a display such as a display panel or CRT.

An operator informed of this information checks the actual condition on roads, from images obtained by television cameras if they are installed on roads. If a traffic accident or some other accident has occurred, this is reported to a police station or other offices in charge of such an accident. If no television camera is installed, the operator calls a nearby patrol car or the like to initiate a check of the road condition.

If an operator cannot find the cause of an accident in short time, the simulator executes an analysis of the cause of an accident. Namely, the simulator checks if the capacity of a road upstream or downstream of, or near to, the point with a large traffic difference, has become small, or checks other cases. For example, if an accident occurs at the point A in FIG. 6, the estimated traffic differs greatly from the present data obtained by the vehicle detectors. In such a case, A, B, C, D and E points near the point with a large traffic difference are used as candidate points for the accident site. The simulator again estimates the traffic during the time period while the measured values and estimated values first differed, by considering each of the possible causes. The cause providing the nearest measured traffic is considered as the cause representing road condition. Under this road condition, the traffic signal parameters are adjusted. A plurality of simulations may be executed using a single processor. It is preferable however to execute simulation by using a plurality of processors, to obtain the simulation result quickly. If the operator can identify the cause prior to obtaining the simulation result, the traffic signal parameters are changed so as to match the identified cause.

With the traffic control system of this embodiment, it is possible to quickly find an accident occurrence or illegal parking, by using a small number of traffic measurement points. Road congestion can be minimized by quickly controlling traffic signal parameters and the contents of guidance display.

Figure 7:
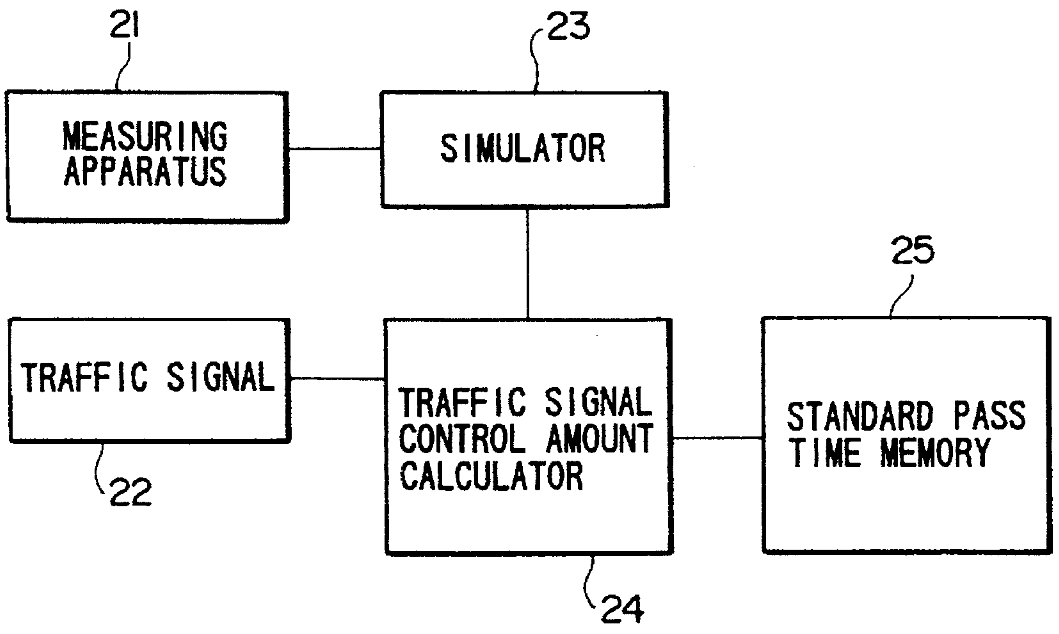
FIG. 7 is a block diagram showing the structure of a traffic signal controller according to an embodiment of the present invention.
Figure 8:
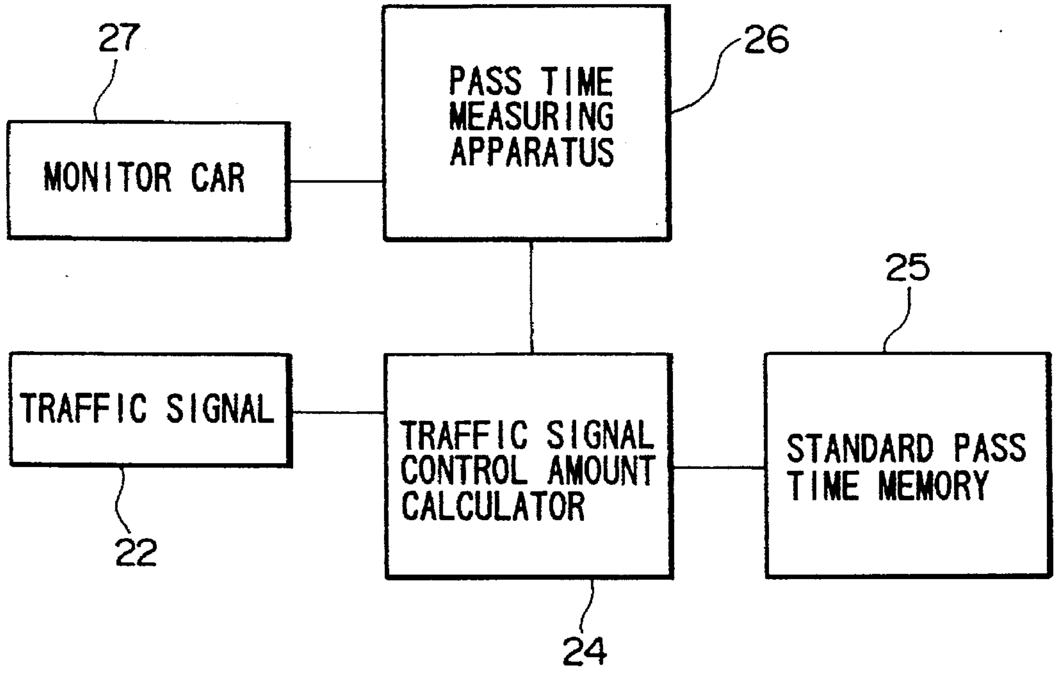
FIG. 8 is a block diagram showing the structure of another traffic signal controller of the present invention.

A traffic signal controller according to the third embodiment of the present invention will be described with reference to FIG. 7. The traffic signal controller includes a traffic measuring apparatus 21 using vehicle detectors, traffic signals 22, a parameter calculator 24 for calculating parameters of the traffic signals, a traffic simulator 23 for estimating traffic by using real time traffic and traffic signal parameters, and a memory 25 for storing vehicle pass times. A standard pass time for each road is calculated using the length of the road and its legal speed limit, and stored in the memory 25. Not energy can pass through a road within the standard pass time, because of a stop at a traffic signal or a stop by congestion. A difference between the standard pass time and an actual pass time is called a wait time.

The actual pass time is obtained by one of the first and second methods. According to the first method, the simulator 23 simulates the present traffic by on-line receiving parameters of traffic signals at each intersection and traffic condition information obtained at each road, and calculates the actual pass time. In other words, the simulator traces the motion of each vehicle to obtain the actual pass time. In accordance with the obtained information, a traffic control center adjusts the traffic signal parameters to the values calculated by the parameter calculator.

According to the second method, the actual pass time is obtained from the present position information transmitted from each monitor car 27 on a road. Namely, the actual pass time from the position A at time t to the position A' at time t' is t"−t. This calculation is made by a pass time measuring apparatus 26. Although a monitor car 27 dedicated to such an operation may be used, other vehicles such as taxis, buses and patrol cars running on roads may be used in practice. Information of vehicle numbers and present positions are sent via wire or wireless transmission medium to the traffic control center which in turn adjusts the traffic signal parameters calculated by the parameter calculator 24.

Figure 9:
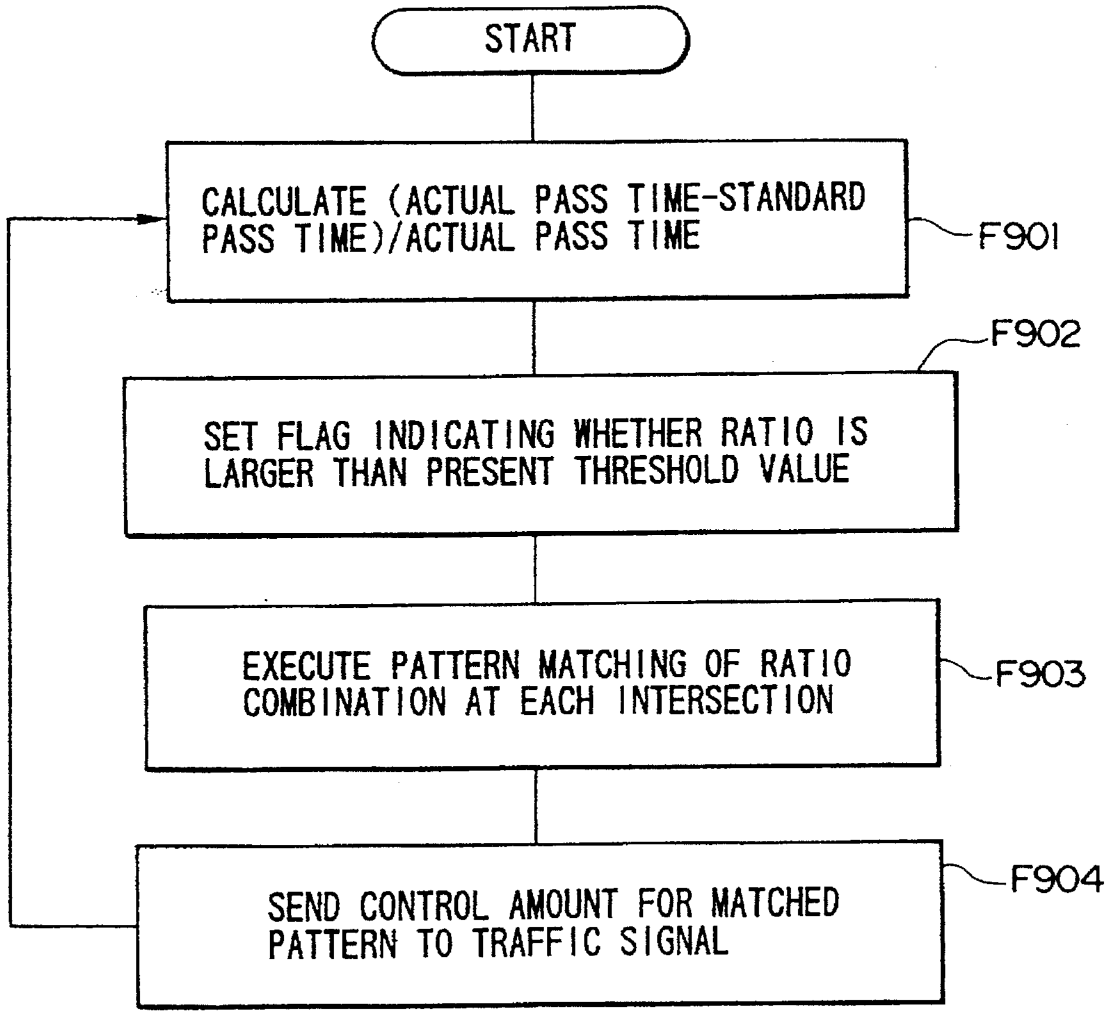
FIG. 9 is a timing chart showing the procedure of controlling traffic signals by using vehicle pass times.
Figure 10B:
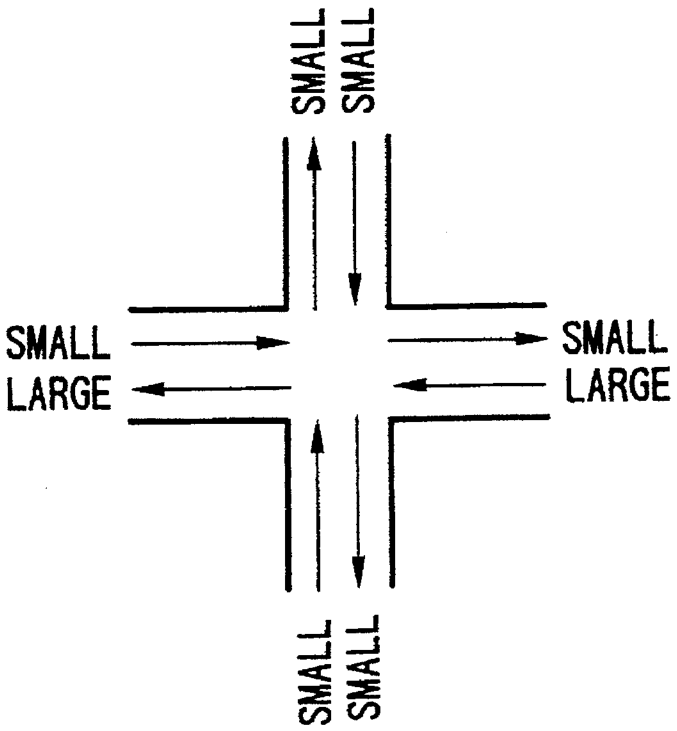
FIGS. 10A and 10B are diagrams showing traffic patterns at an intersection to be used for traffic signal control.
Figure 10A:
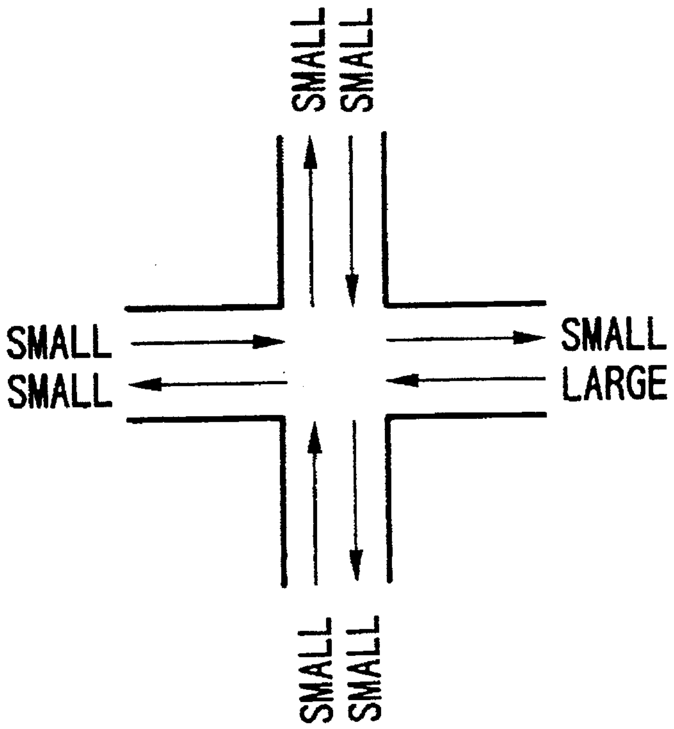

The processes to be executed by the parameter calculator 24 are shown in the flow chart of FIG. 9. Calculated first is a ratio of a difference between an actual pass time and a standard pass time to the actual pass time (step F901). A flag representing whether the calculated ratio is larger or smaller than a predetermined threshold value is set (step F902). Predetermined patterns of combinations of ratios at each intersection are compared with an actual pattern of ratios (step F903). The traffic signal parameters for the matched pattern are sent to the traffic signal, and thereafter the control returns to step F901 (step F904). Example of patterns of combinations of ratios are shown in FIGS. 10A and 10B. FIG. 10A shows a large inflow traffic only in one direction. In this case, the turn-on periods of green signal lights on roads in this one direction are set longer. FIG. 10B shows a large straight flow traffic before and after an intersection. In this case, an off set from the upstream traffic signal is changed.

With this embodiment, it is possible to set traffic signal parameters suitable for the-present traffic condition. The wait time can be minimized not only at main intersections but also in a broad road area. Therefore, road congestion can be prevented while minimizing the time required for reaching a destination.

Figure 11:
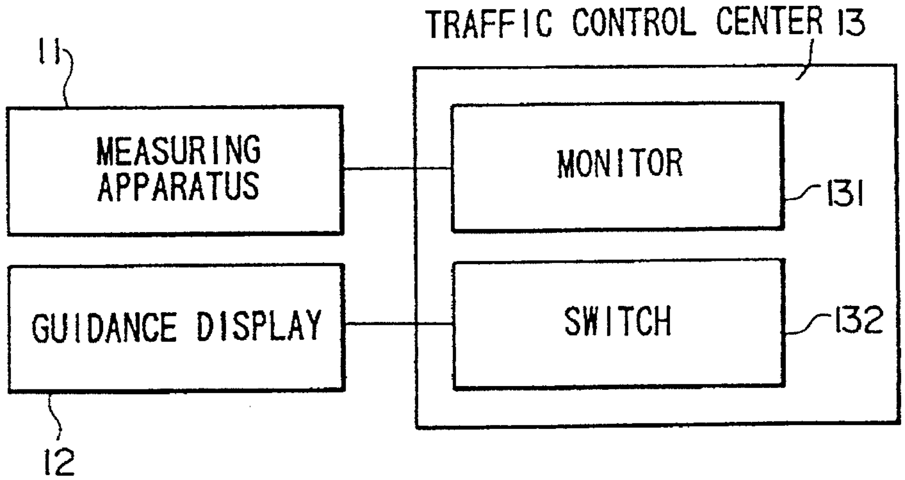
FIG. 11 is a block diagram showing an example of the structure of a guidance display according to an embodiment of the present invention.

A guidance display according to the fourth embodiment of the present invention will be described with reference to FIG. 11. A traffic monitoring or measuring apparatus 11 may use television cameras or vehicle detectors. The traffic measuring apparatus 11 is installed on a plurality of roads. Information obtained by the traffic measuring apparatuses 11 is sent via wire or wireless transmission medium to the site with a controller of the guidance display 12, e.g., a traffic control center 13. An operator checks an occurrence of congestion based upon images or traffic on a monitor 131, and controls the guidance display 12. The guidance display 12 is installed downstream of the point where the traffic is great and congestion occurs frequently. The guidance display 12 displays a bypath road in many cases. The bypath road can be selectively displayed upon turning on or off a switch 132.

Figure 12:
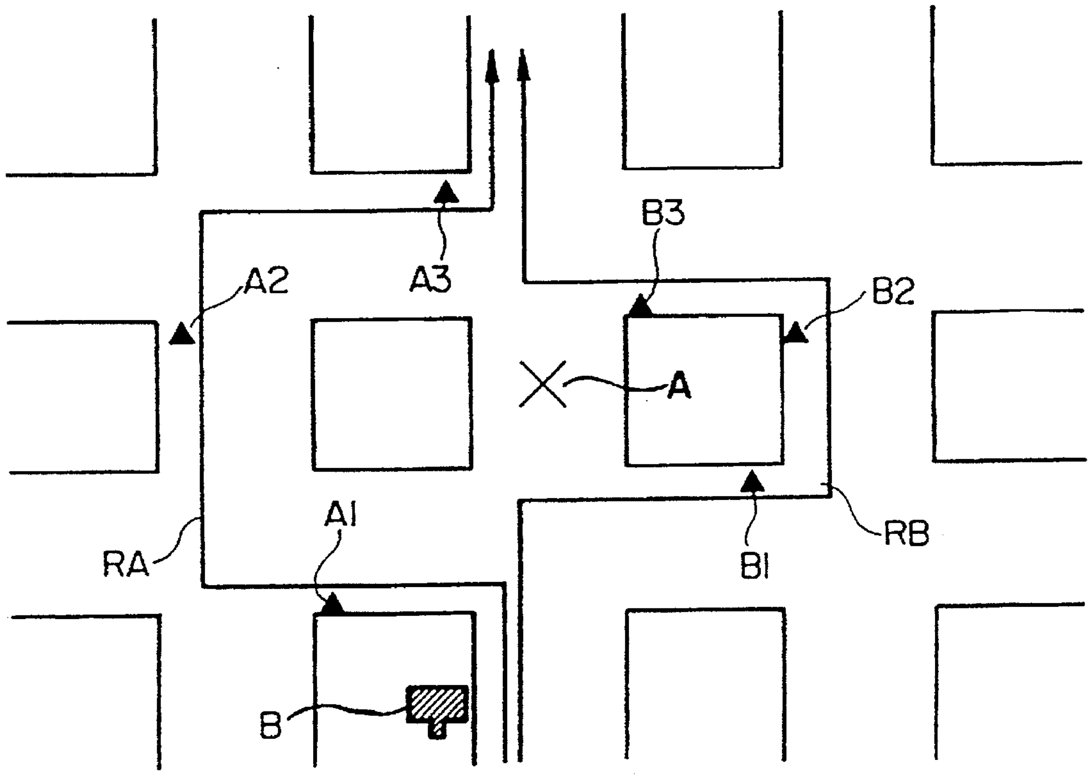
FIG. 12 shows an example of a road map used for explaining the function of a guidance display.

A plurality of bypath roads are selectively displayed so as to provide a bypath road that is not congested, while monitoring the congestion condition of each bypath road. For example, consider the road map shown in FIG. 12. If an accident occurs at the point A, two bypaths RA and RB can be used. In this case, the guidance display is required to be installed before the point B. The traffic measured at points A1, A2 and A3 on the bypath road RA and at points B1, B2 and B3 on the bypath road RB.

Figure 13:
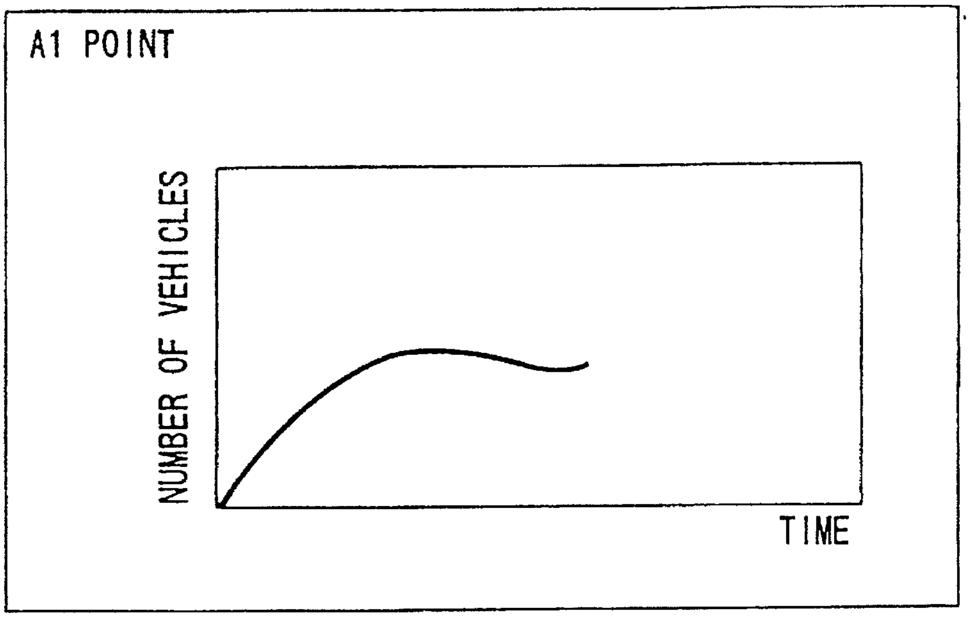
FIG. 13 is an example of a graph displayed on a display, the graph showing measured traffic information relative to time.
Figure 14:
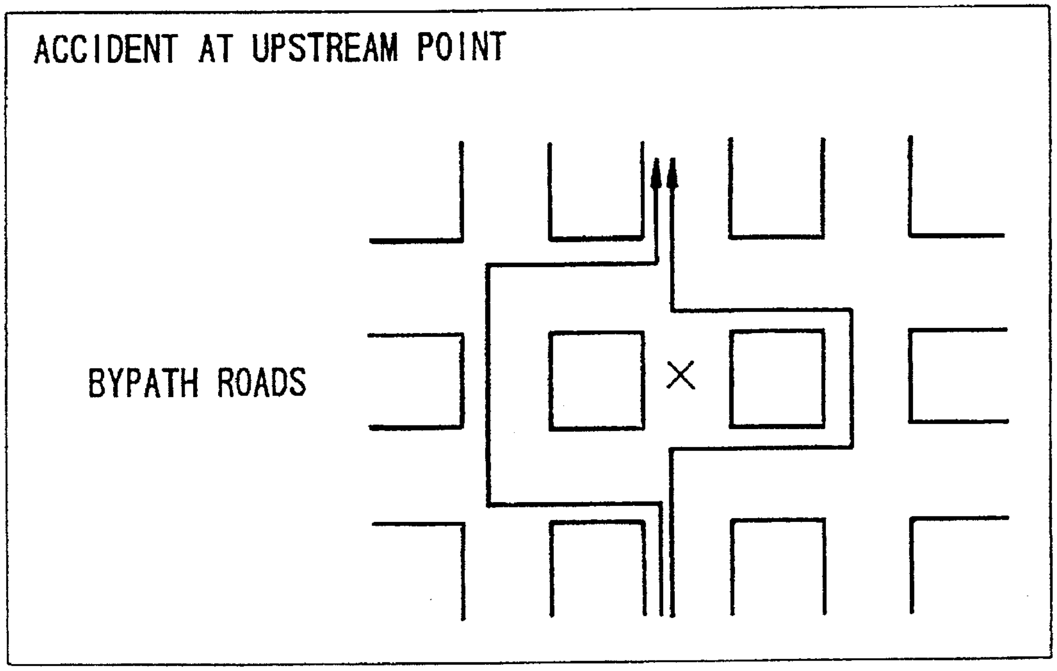
FIG. 14 shows an example of information displayed on a guidance display.

Information obtained at each point is displayed on the monitor 131 as shown in FIG. 13, as the traffic changing with time. An operator monitoring the information on the monitor 131, provides vehicle drivers with the information such that shown in FIG. 14 by displaying it on the guidance display. In this example, two bypath roads are displayed. If one of the bypath roads becomes congested, its indication is erased from the guidance display upon actuation of the switch. This timing of switching the display may be at the time when an operator recognizes congestion, at the time when a possible congestion is estimated from an increasing traffic, or at any other time.

Figure 15:
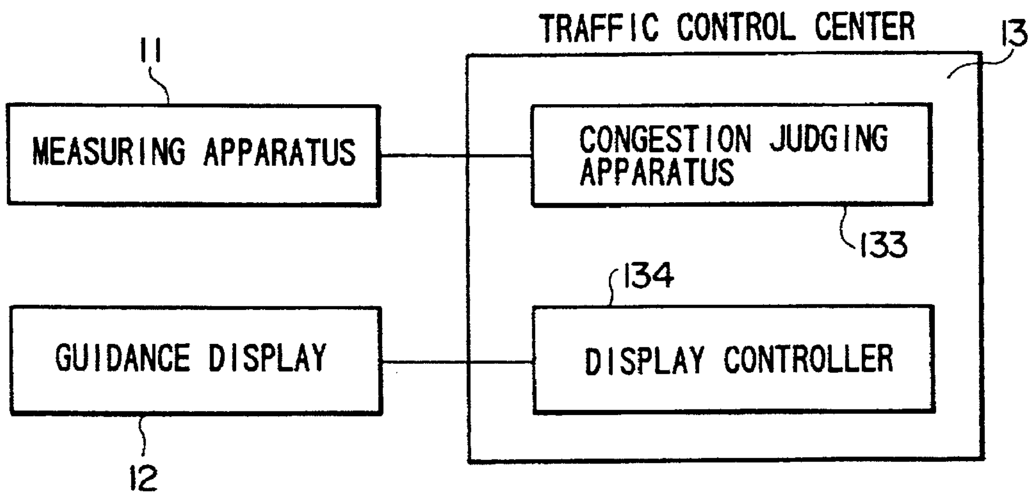
FIG. 15 shows another example of the structure of a guidance display according to the present invention.

Another example of the guidance display 12 is shown in FIG. 15. A computer 13 on-line receives information of the traffic condition measured by a traffic measuring apparatus 11 via transmission medium. The computer 13 is also connected to the guidance display 12. The display contents on the guidance display 12 can be turned on or off, or changed upon reception of an external signal. If traffic sent from the traffic measuring apparatus to the computer is larger than a predetermined congestion value, a signal is sent to activate the guidance display to display bypath road information. Namely, a congestion judging apparatus 133 evaluates a congestion. If it judges a congestion, a display controller 134 sends a command to the guidance display to change its display contents.

Figure 16:
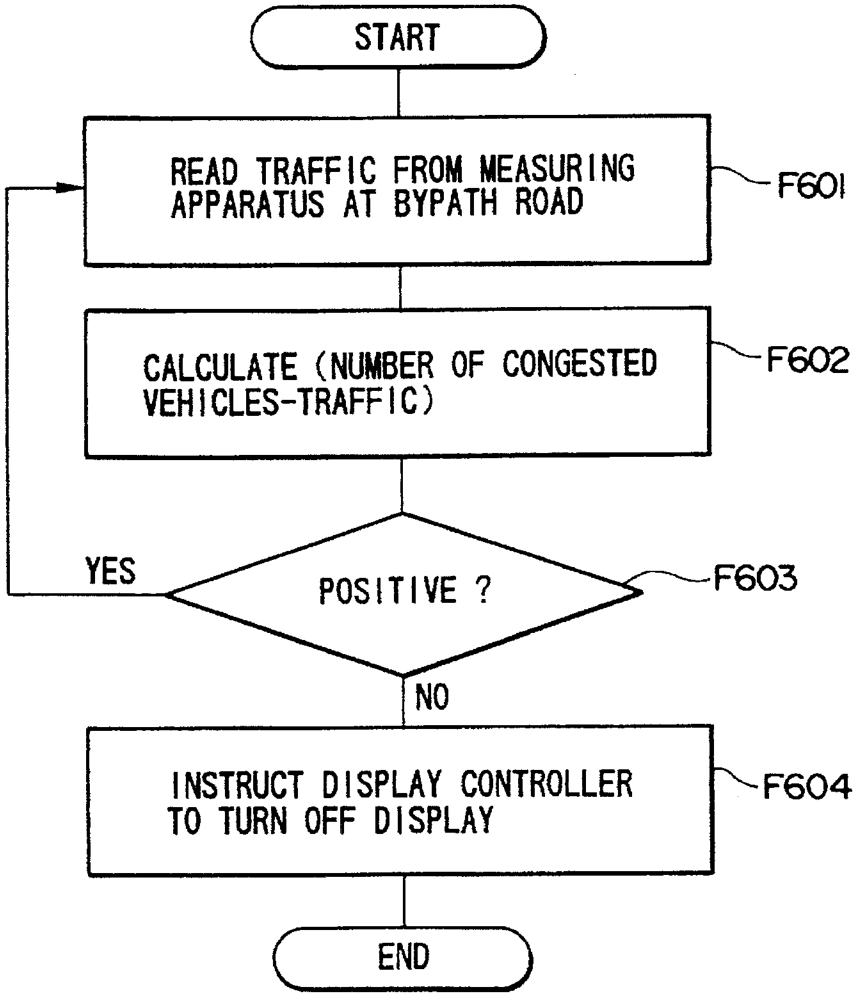
FIG. 16 is a flow chart showing the procedure of automatically controlling the guidance display.

The processes to be executed by the congestion judging apparatus 133 are shown in the flow chart of FIG. 16. The traffic of a bypath road is read from the traffic measuring apparatus (step F601) to subtract the number of passed vehicles from the number of congested vehicles (step F602). If the subtracted result is positive (step F603), it is considered that no congestion exists, and the control returns to step F601. If the subtracted result is negative, it is considered that congestion has occurred, and a display turn-off command is sent to the display controller (step F604) to erase the display of the congested bypath road indication. With this system, the display can be turned on and off automatically without the help of an operator.

Use of a computer program for estimating the future traffic condition from the time sequential trend of information sent from the traffic measuring apparatus allows one change of the display contents before an occurrence of congestion. Congestion having occurred requires a lot of time to release or eliminate it. With this arrangement, the occurrence of congestion can be prevented in advance. Furthermore, use of a computer program for simulating a traffic flow, allows a more correct estimation of an occurrence of congestion to control the guidance display it the estimated congestion timing. With this arrangement, it is possible to reliably prevent an occurrence of congestion in advance.

With this embodiment, congestion on a bypath road can be prevented, minimizing the time required for reaching a destination, while eliminating the case where a longer time is required and when a bypath road is not used.

Figure 17:
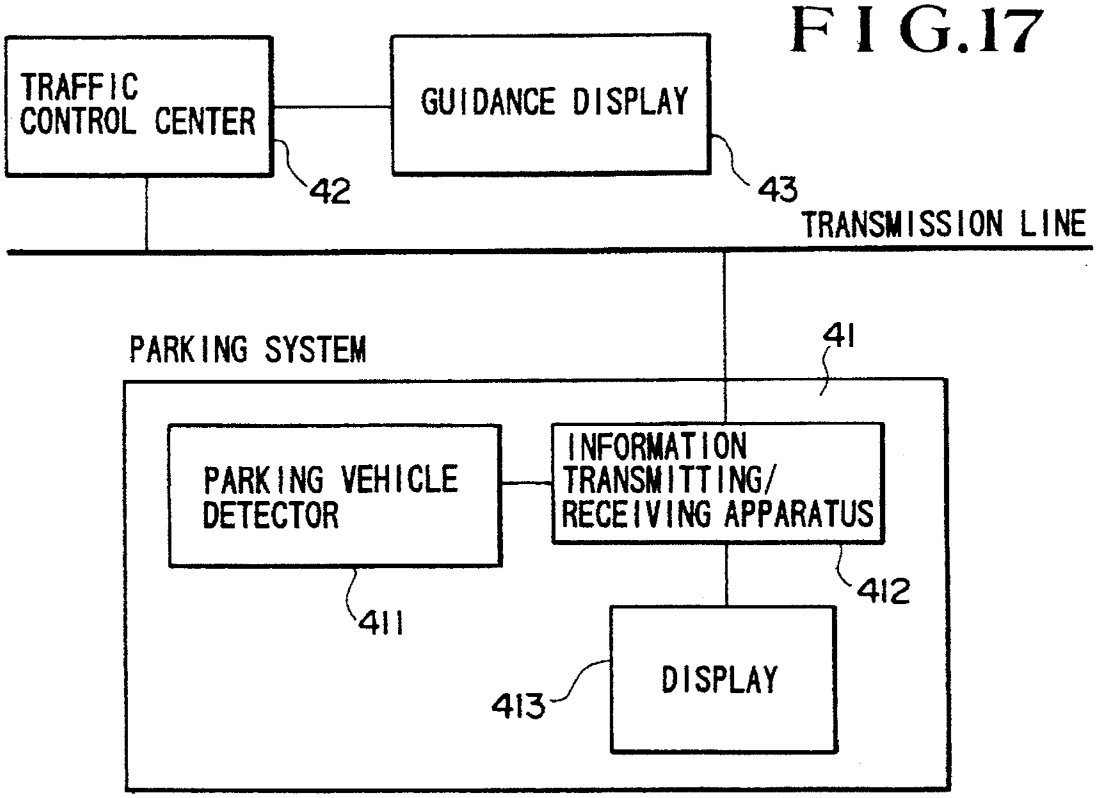
FIG. 17 shows an example of the structure of a parking system according to an embodiment of the present invention.

A parking system according to the fifth embodiment of the present invention will be described with reference to FIG. 17. The parking system 41 is connected via wire or wireless transmission medium to a traffic control center 42 to send and receive information to and from the center via an information transmitting/receiving apparatus 412. A parking vehicle detector 411 detects a parking vehicle and sends information of parking vehicles to the traffic center via the information transmitting/receiving apparatus 412. The traffic control center collects parking vehicle information from a number of parking systems 41. The control center supplies the information to a broadcasting company to broadcast it, to vehicle mount type communication information systems, or to the guidance display 43 to display it. In this manner, the parking vehicle information is supplied to vehicle drivers, reducing unnecessary traffic.

The traffic control center supplies the information indicating whether parking is possible or not, to the parking system via the information transmitting/receiving apparatus 412, depending upon the traffic conditions. The received information is displayed on a display 413 to provide it to drivers. For example, parking at the area where congestion is occurring during rush hours in the morning and evening is prohibited, and parking at the night is allowed. The traffic control center supplies the parking system not only with the current traffic conditions, but also with an occurrence of congestion estimated from the traffic conditions obtained by a simulator or the like in order to prevent congestion.

Figure 18:
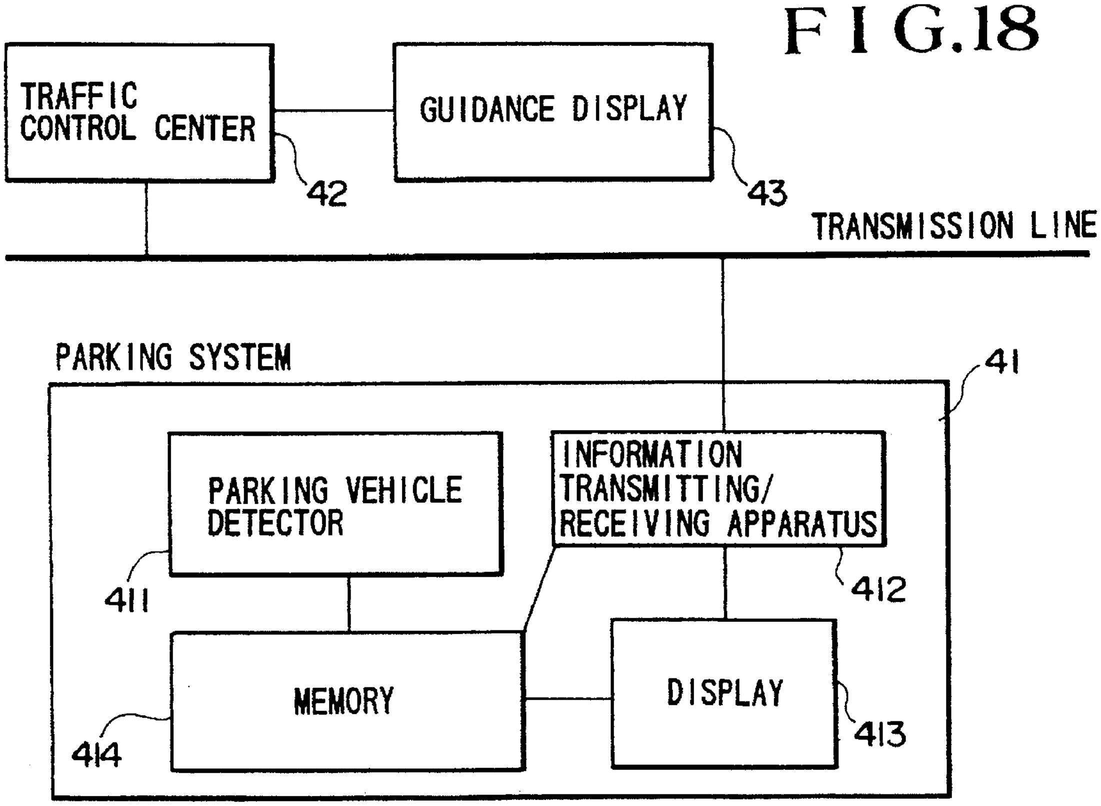
FIG. 18 shows an example of the structure of a parking system connected to a transmission medium.
Figure 19:
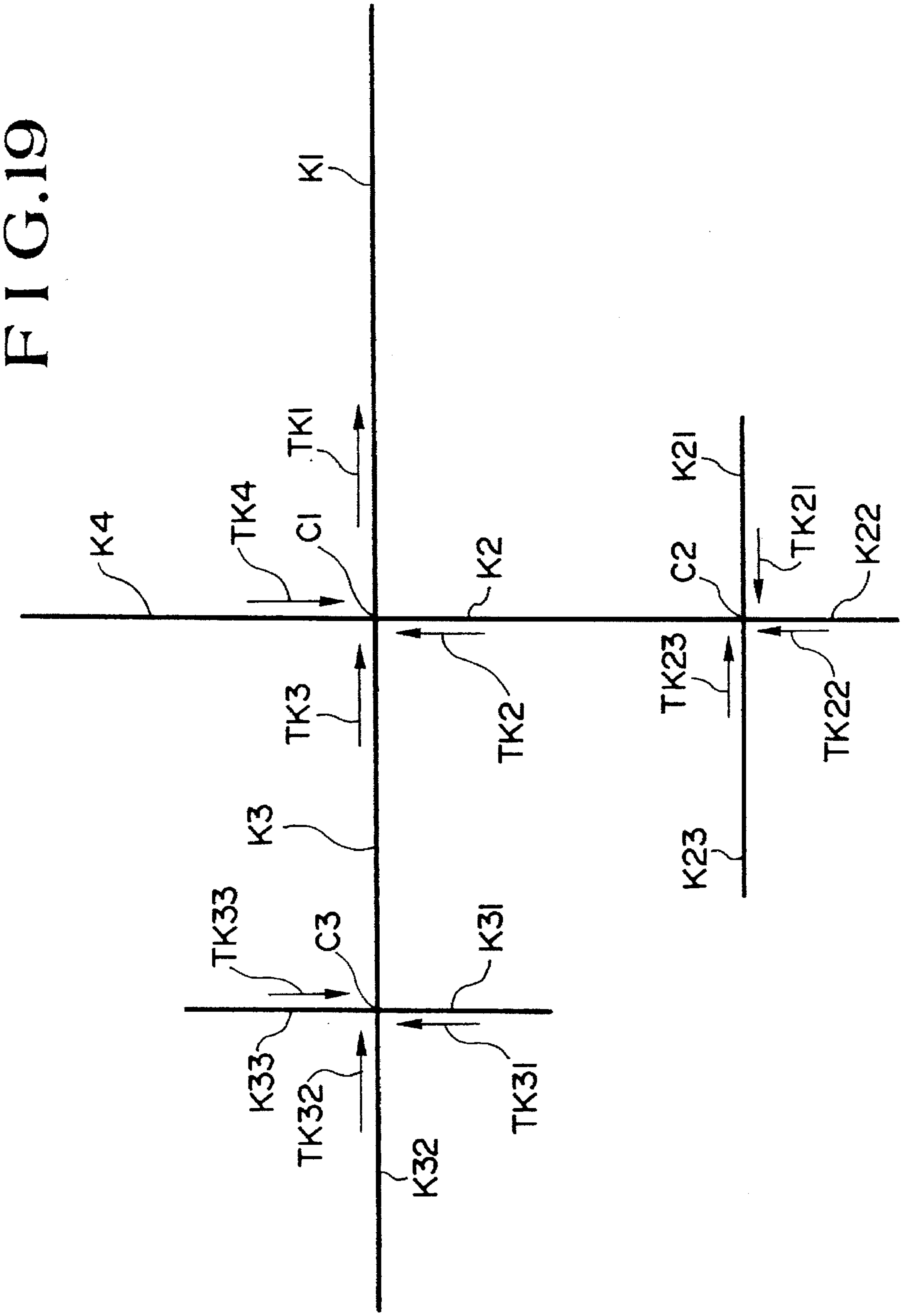
FIG. 19 is a schematic diagram used for explaining the fundamental principle of the present invention.

As shown in FIG. 18, the amount of information and the number of information transfers via transmission medium can be reduced by providing a memory 414 to a parking system 41. More specifically, in the parking system shown in FIG. 17, information indicating "parking not allowed" is sent from the traffic control center 42 to the parking system 41 which then displays it on the display 413. On the other hand, in the parking system shown in FIG. 18, information indicating "parking not allowed" is assigned a code "1" for example and stored in the memory 414. The center sends only the code information "1" to the parking system 41 which reads the corresponding information from the memory 414 to display it. In a similar manner, information from the parking vehicle detector 411 itself is not sent directly to the traffic control center 42, but is buffered once using the memory 414. Therefore, periodical information transmission or information transmission upon external requests becomes possible.

The traffic control center 42 may process parking vehicle data, for example, statistically calculating the information of an average parking time for each time period, an average parking time at each district, an average parking time at each day, and the like. In this case, an average parking demand at each parking system can be obtained. Using this average parking demand allows an estimation of a parking demand for each day and provide it to drivers in the manner described above, or to use it as the data for planning a parking area construction.

With this embodiment, parking meters can be flexibly operated in accordance with the traffic conditions at the nearby area, to prevent congestion otherwise caused by vehicles intended to park and deal with an insufficient space of parking areas. Furthermore, by providing drivers with necessary information, it is possible to prevent unnecessary traffic and congestion.

As appreciated from the foregoing description of the present invention, it is possible to prevent congestion in advance and provide traffic control suitable for the traffic conditions at the nearby area and estimated traffic conditions. It is therefore possible to minimize the time required for each vehicle to reach a destination.

In the above embodiments, traffic signals with variable parameters have been used. A vehicle guidance display may be used which periodically changes the display contents. For example, the guidance display displays a right-turn indication and a straight pass indication at periods of 10 seconds and 5 seconds, an indication distributing traffic to two roads, or an indication guiding top ten vehicles to the right-side-bypath road.

As the traffic measuring apparatus, a vehicle detector installed on a road has been used. The present invention is not limited to this. For example, a traffic may be measured by receiving signals from transmitters mounted on vehicles.

The vehicle guidance display may use a display installed on a road, a display mounted on a vehicle, or a wireless receiver mounted on a vehicle.

Use of the traffic control system of this invention obtain a correct traffic increase/decrease quantity between main points and correct traffic, thereby reliably preventing and relieving congestion.

Use of the guidance display of the present invention prevent an occurrence of congestion of a bypath road, providing proper information while eliminating the case where a longer time is required than the bypath road is not used.

Use of the traffic signal control method using a wait time of the present invention allows one distribution of waiting periods for vehicles not only at main intersections but also within a broader area, thereby flexibly dealing with congestion and minimizing a pass time.

The parking meter of the present invention can operate flexibly so as to match the traffic conditions, providing one solution to hard problems of congestion and insufficient parking space. On-line connection of the parking meter provides drivers with necessary information, reducing unnecessary traffic also providing one solution to congestion.

Use of the traffic control system of the present invention locates the site of a traffic accident on a road or the site of an illegally parked vehicle, to adjust traffic signal parameters based upon the obtained information, and at the same time to properly deal with such an accident or illegal parking.

According to the present invention, it is possible to grasp the traffic conditions at the nearby area, to prevent and release congestion, and to maximize the traffic of a road. A traffic control system can therefore be realized which minimizes the time required for each vehicle to reach a destination.

We claim:

1. A vehicle guidance system for guiding a vehicle on a road to a bypath road, comprising:

target traffic setting means for setting target traffic of the bypath road;

real-time traffic measuring means for measuring traffic of said bypath road in real-time;

instruction means for supplying an instruction to the vehicle to avoid traffic congestion of said road; and guidance control means for controlling said instruction means so as to reduce a difference between said target traffic and said real-time traffic.

2. A vehicle guidance system according to claim 1, wherein said guidance control means controls said instruction means to distribute part of said traffic on said road to said bypath road.

3. A vehicle guidance system according to claim 1, wherein said instruction means includes a traffic signal.

4. A vehicle guidance system according to claim 1, wherein said instruction means includes a display device for displaying a bypath road.

5. A vehicle guidance system according to claim 1, wherein said real-time traffic measuring means measures traffic by receiving a signal from a transmitting apparatus mounted on a vehicle.

6. A vehicle guidance system for guiding a vehicle on a road to a bypath road, comprising:

target traffic setting means for setting target traffic of the bypath road;

real-time traffic measuring means for measuring the traffic of said bypath road in real-time;

traffic estimating means for estimating the traffic of said bypath road by using said real-time traffic;

instruction means for supplying an instruction to a vehicle to avoid traffic congestion of said road; and guidance control means for controlling said instruction means so as to reduce a difference between said target traffic and said real-time traffic.

7. A vehicle guidance system according to claim 6, wherein said traffic estimating means includes past data storage means for storing past traffic data, retrieving means for retrieving said past traffic data nearest said real-time traffic by comparing said real-time traffic with said past traffic data, said retrieved past traffic data being used as estimated traffic.

8. A vehicle guidance system according to claim 6, wherein said traffic estimating means includes a simulator for estimating the traffic of said bypath road by using said real-time traffic and road capacity as parameters.

9. A vehicle guidance system according to claim 8, further comprising right/left turn percentage measuring means for measuring a right/left turn percentage of vehicles at an intersection, said simulator estimating the traffic by using said right/left turn percentage.

10. A vehicle instructing and controlling system for controlling traffic, comprising:

instruction means for supplying a traffic instruction to indicate a route to a vehicle;

real-time traffic measuring means for measuring traffic of a road in real-time;

a simulator external to said vehicle for estimating a vehicle wait time by using said instruction supplied by said instruction means and said real-time traffic; and a controller for controlling said instruction means so as to reduce a sum of said estimated wait times multiplied by predetermined weighted coefficients for said vehicle.

11. A vehicle instructing and controlling system according to claim 10, wherein said instruction means includes a traffic signal, and said controller includes a traffic signal parameter controller for controlling the parameters of said traffic signal.

12. A vehicle instructing and controlling system according to claim 10, wherein said instruction means includes a display device for guiding a vehicle, and said controller includes a display content controller for changing the display contents of said display device.

13. A vehicle instructing and controlling system according to claim 10, wherein said real-time traffic measuring means measures the traffic by receiving a signal from a transmitting apparatus mounted on a vehicle.

14. A vehicle instructing and controlling system according to claim 10, further comprising right/left turn percentage measuring means for measuring a right/left turn percentage of vehicles at an intersection, said simulator estimating the traffic by using said right/left turn percentage.

15. A traffic control system, comprising:

means for receiving parameters of traffic signals on a road;

traffic measuring means for measuring traffic in real-time;

a simulator for estimating traffic by using the parameters of said traffic signals and said real-time traffic;

calculating means for calculating a difference between said estimated traffic and, actual traffic at the time corresponding to said estimated traffic;

instruction means for providing an indication of a road point at which said difference becomes equal to or larger than a predetermined value; and display means responsive to an instruction by said instruction means for displaying said road point and an indication of an occurrence of an accident at said road point.

16. A traffic control system according to claim 15, further comprising right/left turn percentage measuring means for measuring a right/left turn percentage of vehicles at an intersection, said simulator estimating the traffic by using said right/left turn percentage.

17. A traffic control system, comprising:

traffic difference calculating means for calculating a difference between integrated traffic at opposite ends of a road section having traffic measuring means at the opposite ends;

intermediate inflow/outflow traffic calculating means for calculating an intermediate inflow/outflow traffic going into or coming from another road section connected to an intermediate point of said road section exclusive of said traffic measuring points, by using said integrated traffic difference; and control means for suppressing said inflow traffic of a branch road within said road section.

18. A traffic control system comprising:

means for detecting outflow traffic to one road whose traffic is to be controlled, from an intersection having three or more roads;

means for detecting inflow traffic to said one road from each of other roads different from said one road, to thereby control the inflow traffic;

means for setting allowable traffic of said one road to be controlled based on the detected inflow traffic;

means, connected to said outflow traffic detecting means and said setting means, for comparing said outflow traffic with said allowable traffic, and sensing an occurrence of a saturated traffic condition of said one road to be controlled; and suppressing means, connected to said comparing and sensing means and responsive to an occurrence of said saturated traffic condition, for suppressing said inflow traffic to said one road from at least one of said other roads, wherein said suppressing means suppresses said inflow traffic to said one road from said at least one other road, at an intersection upstream of said intersection, to increase the number of intersections at which said inflow traffic is suppressed and to expand a traffic control area.

19. A traffic control system according to claim 18, wherein said suppressing means suppresses said inflow traffic to said one road from said at least one other road, sequentially at upstream intersections to expand the traffic control area, until said saturated traffic condition is released.

20. A traffic control system according to claim 18, wherein said suppressing means includes indication means for indicating a bypath road for guiding traffic at said intersection to an intersection downstream of said one road to be controlled.

21. A traffic control system comprising:

means for detecting overflow traffic to one road whose traffic is to be controlled, from an intersection having three or more roads;

means for detecting inflow traffic to said one road from each of other roads different from said one road to be controlled;

means for setting allowable traffic of said one road to be controlled based on the detected inflow traffic;

means connected to said outflow traffic detecting means and said setting means, for comparing said outflow traffic with said allowable traffic, and estimating an occurrence of a saturated traffic condition of said one road to be controlled; and means connected to said estimating means and responsive to an estimation of an occurrence of said saturated traffic condition, for suppressing said inflow traffic to said one road from at least one of said other roads, wherein said suppressing means suppresses said inflow traffic to said one road from said at least one other road, at an intersection upstream of said intersection, to increase the number of intersections at which said inflow traffic is suppressed and to expand a traffic control area.

22. A traffic control system according to claim 21, wherein said suppressing means suppresses said inflow traffic to said one road from said at least one other road, sequentially at upstream intersections to expand the traffic control area, until said saturated traffic condition is released.

23. A traffic control system according to claim 21, wherein said suppressing means includes indication means for indicating a bypath road for guiding traffic at said intersection to an intersection downstream of said one road to be controlled.

24. A traffic control system, comprising:

means for detecting outflow traffic to one road whose traffic is to be controlled and traffic of at least two bypath roads, said one road and said at least two bypath roads constituting a traffic control area;

means for setting allowable traffic of said one road to be controlled;

means for setting target traffic of said at least two bypath roads;

first means connected to said detecting means and said allowable traffic setting means, for comparing said outflow traffic to said one road to be controlled with said allowable traffic, and sensing an occurrence of a saturated traffic condition of said one road to be controlled;

indication means connected to said first comparing and sensing means and responsive to an occurrence of said saturated traffic condition, for indicating one of said at least two bypath roads to vehicles going toward said one road to be controlled;

second means connected to said detecting means and said allowable traffic setting means, for comparing actual traffic of said indicated bypath road with said target traffic, and sensing an occurrence of a saturated traffic condition of said indicated bypath road; and indication controlling means connected to said second comparing and sensing means and said indication means and responsive to an output from said second sensing means, for prompting said indication means to indicate another bypath road of said at least two bypath roads.

25. A traffic control system, comprising:

means for detecting outflow traffic to one road whose traffic is to be controlled and traffic of at least two bypath roads, said one road and said at least two bypath roads constituting a traffic control area;

means for setting allowable traffic of said one road to be controlled;

means for setting target traffic of said at least two bypath roads;

first means connected to said detecting means and said allowable traffic setting means, for comparing said outflow traffic to said one road to be controlled with said allowable traffic, and estimating an occurrence of a saturated traffic condition of said one road to be controlled;

indication means connected to said first detecting and estimating means and responsive to an occurrence of said saturated traffic condition, for indicating one of said at least two bypath roads to vehicles going toward said one road to be controlled;

second means connected to said detecting means and said allowable traffic setting means, for comparing the actual traffic of said indicated bypath road with said target traffic, and estimating an occurrence of a saturated traffic condition of said indicated bypath road; and indication controlling means connected to said second comparing and estimating means and said indication means and responsive to an output from said second comparing and estimating means, for prompting said indication means to indicate another bypath road of said at least two bypath roads.

26. A traffic control system having indication means for an operator's usage, comprising:

road information storing means for storing information of a road map and a capacity of respective roads on said road map;

traffic measuring means for measuring traffic of said respective roads;

traffic increase/decrease quantity calculating means for calculating a traffic increase/decrease quantity between predetermined points, by using said measured traffic;

road traffic calculating means for calculating traffic of a predetermined road, by using said traffic increase/decrease quantity;

area determining means for determining an area which is an area for congestionless traffic, by using said calculated traffic and said road capacity while maintaining said traffic increase/decrease quantity to a proper value; and means for prompting said indication means to indicate the area for congestionless traffic.

27. A traffic control system according to claim 26, further comprising:

available traffic calculating means for calculating maximum traffic allowed to enter said area without congesting said area; and area traffic suppressing means for suppressing traffic moving toward said area in accordance with said maximum traffic.

28. A traffic control system according to claim 27, further comprising:

traffic signals set using variable parameters in response to said available traffic calculation means and said area traffic suppressing means; and traffic signal parameter setting means for setting the parameters of said traffic signals to regulate the variable traffic.

29. A traffic control system according to claim 27, further comprising information supplying means for supplying information to vehicles outside said area, and wherein said area traffic suppressing means includes instruction means for instructing said information supplying means outside said area to supply the boundary of said area, information of suppressing said maximum traffic allowed, and an indication of bypassing said area, either singularly or in combination thereof.

30. A traffic control system according to claim 29, wherein said information supplying means includes a display device installed on a road.

31. A traffic control system according to claim 29, wherein said information supplying means includes a display device mounted on a vehicle.

32. A traffic control system according to claim 29, wherein said information supplying means includes wireless receiving means mounted on a vehicle and transmitting means for transmitting radio waves to said wireless receiving means.

33. A traffic control system according to claim 28, wherein said area traffic suppressing means includes instruction means for instructing said traffic signal parameter setting means to set the variable parameters of said traffic signals outside said area to suppress the traffic moving toward said area.

34. A traffic control system according to claim 28, wherein said area traffic increasing means includes instructing means for instructing said traffic signal parameter setting means to set the variable parameters of said traffic signal within said area to increase the traffic within said area.

35. A traffic control system according to claim 26, further comprising area traffic increasing means for controlling an increase of traffic within said area.

36. A traffic control system according to claim 35, further comprising information supplying means for supplying information to vehicles within said area, and wherein said area traffic increasing means includes instruction means for instructing said information supplying means within said area to supply the boundary of said area, prohibition of parking/stopping within said area, and an indication of bypassing a congested road within said area and moving to another road within said area, either singularly or in combination thereof.

37. A traffic control system according to claim 36, further comprising a parking system installed on a parking area near a road, said parking system detects a parked/stopped vehicle to indicate a violation of the prohibition thereof and includes display means for displaying the detected results and notifying vehicles on a road of the detected results.

38. A traffic control system according to claim 37, wherein said area traffic increasing means indicates to said display means of said parking system within said area to display an indication of the parking/stopping prohibition, and said display means displays said parking/stopping prohibition.

39. A traffic control system according to claim 26, wherein said traffic measuring means includes light radiating means for radiating one of a slit light beam and a spot light beam to the body of a vehicle, and an image receiving apparatus for receiving a reflected light beam from said vehicle at an angle different from the angle of said radiated beam.

40. A traffic control system according to claim 26, wherein said traffic measuring means measures traffic by receiving a signal from a transmitting apparatus mounted on a vehicle.

* * * * *